United States Patent
Kimura et al.

(10) Patent No.: US 10,829,032 B2
(45) Date of Patent: Nov. 10, 2020

(54) LIGHTING CONTROL DEVICE FOR LIGHT SOURCE, VEHICULAR LIGHT, AND LIGHTING CONTROL METHOD FOR LIGHT SOURCE

(71) Applicant: Stanley Electric Co., Ltd., Tokyo (JP)

(72) Inventors: Tomohiro Kimura, Tokyo (JP); Toshiharu Sekioka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/273,172

(22) Filed: Feb. 12, 2019

(65) Prior Publication Data
US 2019/0248271 A1  Aug. 15, 2019

(30) Foreign Application Priority Data

| Feb. 13, 2018 | (JP) | 2018-023287 |
| Feb. 14, 2018 | (JP) | 2018-024209 |
| May 23, 2018 | (JP) | 2018-099040 |
| May 24, 2018 | (JP) | 2018-099855 |

(51) Int. Cl.
| *B60Q 1/10* | (2006.01) |
| *B62J 6/02* | (2020.01) |
| *B60Q 1/18* | (2006.01) |
| *H05B 47/105* | (2020.01) |
| *B62J 45/415* | (2020.01) |

(52) U.S. Cl.
CPC ............... *B60Q 1/10* (2013.01); *B60Q 1/18* (2013.01); *B62J 6/02* (2013.01); *H05B 47/105* (2020.01); *B60Q 2300/132* (2013.01); *B62J 45/4151* (2020.02)

(58) Field of Classification Search
CPC ............................ B60Q 1/10; F21W 2107/17
See application file for complete search history.

(56) References Cited

U.S. PATENT DOCUMENTS

2017/0182929 A1* 6/2017 Sakamoto ............. F21S 41/285
2017/0182930 A1  6/2017 Sakamoto et al.

FOREIGN PATENT DOCUMENTS

| JP | 2017-119474 A | 7/2017 |
| JP | 2017-119475 A | 7/2017 |

* cited by examiner

*Primary Examiner* — Sean P Gramling
(74) *Attorney, Agent, or Firm* — Xsensus LLP

(57) ABSTRACT

Provided is a lighting control device capable of reducing the lighting delay when a light source is turned on/off in accordance with the bank angle of a vehicle. The lighting control device which controls the lighting state of the light source sets the time period required for turning on the light source to be shorter as the vehicle speed is higher when the inclination angle of a vehicle body in the vehicle width direction is larger than a reference value, and causes the light source to be fully turned on over the set time period. The lighting control device also sets the time period required for turning off the light source to be shorter as the vehicle speed is higher when the inclination angle of a vehicle body is smaller than a reference value, and causes the light source to be dimmed and turned off over the set time period.

20 Claims, 14 Drawing Sheets

FIG. 4

| VEHICLE SPEED (km/h) | LIGHTING CONTROL TIME PERIOD (ms) |
|---|---|
| ⋮ | ⋮ |
| 50 | $T_{50}$ |
| 55 | $T_{55}$ |
| 60 | $T_{60}$ |
| ⋮ | ⋮ |
| 100 | $T_{100}$ |

FIG. 12

| VEHICLE SPEED (km/h) | LIGHTING CONTROL TIME PERIOD (ms) |
|---|---|
| ⋮ | ⋮ |
| 50 | $T_{50}$ |
| 55 | $T_{55}$ |
| 60 | $T_{60}$ |
| ⋮ | ⋮ |
| 100 | $T_{100}$ |

| VEHICLE SPEED (km/h) | LIGHTING CONTROL TIME PERIOD (ms) | | | | | | |
|---|---|---|---|---|---|---|---|
| | ACCELERATION <0 | | | ACCELERATION =0 | ACCELERATION >0 | | |
| | SMALL | MIDDLE | LARGE | --- | SMALL | MIDDLE | LARGE |
| ⋮ | ⋮ | ⋮ | ⋮ | ⋮ | ⋮ | ⋮ | ⋮ |
| 50 | $T_{50a}$ | $T_{50b}$ | $T_{50c}$ | $T_{50}$ | $T_{50d}$ | $T_{50e}$ | $T_{50f}$ |
| 55 | $T_{55a}$ | $T_{55b}$ | $T_{55c}$ | $T_{55}$ | $T_{55d}$ | $T_{55e}$ | $T_{55f}$ |
| 60 | $T_{60a}$ | $T_{60b}$ | $T_{60c}$ | $T_{60}$ | $T_{60d}$ | $T_{60e}$ | $T_{60f}$ |
| ⋮ | ⋮ | ⋮ | ⋮ | ⋮ | ⋮ | ⋮ | ⋮ |
| 100 | $T_{100a}$ | $T_{100b}$ | $T_{100c}$ | $T_{100}$ | $T_{100d}$ | $T_{100e}$ | $T_{100f}$ |

LIGHTING CONTROL DEVICE FOR LIGHT SOURCE, VEHICULAR LIGHT, AND LIGHTING CONTROL METHOD FOR LIGHT SOURCE

This application claims the priority benefit under 35 U.S.C. § 119 of Japanese Patent Applications No. 2018-023287 filed on Feb. 13, 2018, No. 2018-024209 filed on Feb. 14, 2018, No. 2018-099040 filed on May 23, 2018, and No. 2018-099855 filed on May 24, 2018, which are hereby incorporated in their entirety by reference.

TECHNICAL FIELD

The presently disclosed subject matter relates to a technique for controlling lighting of a light source installed in a vehicle.

BACKGROUND ART

In a vehicle such as a motorcycle, the position of the headlamp in the vertical direction relatively lowers due to the inclination of the vehicle body at the time of turning, and therefore, the light from the headlamp may not easily reach a distance. To cope with such inconveniences, a technique is known in which an auxiliary lamp (light source) is turned on in accordance with the inclination angle (bank angle) when the vehicle is turning, so that light is irradiated to compensate for the shortage of light irradiation.

For example, Japanese Patent Application Laid-Open No. 2017-119474 (or Patent Literature 1, of which corresponding US patent application publication is US2017/0182930A1) discloses a lighting control technique based on the aforementioned technique. In this lighting control technique, in order to reduce the sense of discomfort to the driver due to the sudden lighting of the auxiliary lamp, the auxiliary lamp is set to a preceding lighting state before a preset target lighting state is achieved, where the brightness of the light in the preceding lighting state is lower than that in the preset target lighting state. More specifically, a threshold value $\theta$ corresponding to the preset target lighting state and another threshold value $\theta_0$ smaller than the threshold value $\theta$ are set in advance, and the auxiliary lamp is turned on at relatively low brightness when the bank angle exceeds the threshold value $\theta_0$. In addition, in a certain range in which the bank angle exceeds 0, the brightness of light is increased in proportion to the bank angle to turn on the auxiliary lamp at that brightness.

Japanese Patent Application Laid-Open No. 2017-119475 (or Patent Literature 2, of which corresponding US patent application publication is US2017/0182929A1) discloses a lighting control technique based on the technique described in Patent Literature 1 as a prerequisite. In this lighting control technique, in order to avoid a delay in turning on the auxiliary lamp when the bank angle greatly changes due to a sudden inclination of the vehicle body, the lighting timing of the auxiliary lamp is advanced as necessary by variably setting the threshold value $\theta$ so that the threshold value $\theta$ becomes smaller as the change in the bank angle per unit time becomes larger. Further, when the auxiliary lamp is turned off, the turning-off timing of the auxiliary lamp is advanced as necessary by using the same lighting control technique.

Incidentally, in the conventional technique according to Patent Literature 2 described above, it has been attempted to reduce the lighting delay and the turning-off delay of the auxiliary lamp on the basis of the amount of change in the bank angle per unit time. However, during actual traveling of a vehicle, the inclination of the vehicle body is also kept changing (for example, the vehicle is kept being inclined more or changing from the inclined state to the upright state) from the start of the change in the bank angle due to the inclination of the vehicle body until the amount of change in the bank angle per unit time is calculated. Therefore, for example, when the inclination of the vehicle body is relatively rapid, the threshold value $\theta$ corresponding to the amount of change in the bank angle per unit time is not set in time. In this case, as a result, a lighting delay or a turning-off delay of the auxiliary lamp may occur.

SUMMARY

The presently disclosed subject matter was devised in view of these and other problems and features in association with the conventional art. According to an aspect of the presently disclosed subject matter, there is provided a technique capable of reducing a lighting delay when a light source is turned on in accordance with a bank angle of a vehicle.

According to another aspect of the presently disclosed subject matter, there is provided a technique capable of reducing a turning-off delay when a light source is turned off in accordance with a bank angle of a vehicle.

According to still another aspect of the presently disclosed subject matter, a lighting control device for a light source is configured to control a lighting state of a light source installed in a vehicle, and the lighting control device is configured to set a time period required for turning on the light source to be shorter as the vehicle speed of the vehicle is higher when an inclination angle of a vehicle body in a vehicle width direction of the vehicle is larger than a reference value, and to bring the light source in a turned-on state over the set time period.

According to still another aspect of the presently disclosed subject matter, a lighting control device for a light source is configured to control a lighting state of a light source installed in a vehicle, and includes: a determination unit configured to determine whether an inclination angle of a vehicle body of the vehicle is larger than a reference value; a setting unit configured to, when the determination unit determines that the inclination angle of the vehicle body is larger than the reference value, set a time period required for turning on the light source according to a vehicle speed of the vehicle so as to be shorter as the vehicle speed of the vehicle is higher; and a lighting control unit configured to bring the light source in a turned-on state over the time period set by the setting unit.

According to still another aspect of the presently disclosed subject matter, a vehicular light includes the lighting control device according to any of the foregoing aspects, and a light source configured to be controlled by the lighting control device According to still another aspect of the presently disclosed subject matter, a lighting control method is a method of controlling a lighting state of a light source installed in a vehicle, including: setting, when an inclination angle of a vehicle body in a vehicle width direction of the vehicle is larger than a reference value, a time period required for turning on the light source to be shorter as the vehicle speed of the vehicle is higher, and bringing the light source in a turned-on state over the set time period.

According to still another aspect of the presently disclosed subject matter, a lighting control device for a light source is configured to control a lighting state of a light source installed in a vehicle, and the lighting control device is configured to set a time period required for turning off the light source to be shorter as the vehicle speed of the vehicle is higher when an inclination angle of a vehicle body in a vehicle width direction of the vehicle is smaller than a reference value, and to bring the light source in a turned-off state over the set time period.

According to still another aspect of the presently disclosed subject matter, a lighting control device for a light source is configured to control a lighting state of a light source installed in a vehicle, and includes: a determination unit configured to determine whether an inclination angle of a vehicle body of the vehicle is smaller than a reference value; a setting unit configured to, when the determination unit determines that the inclination angle of the vehicle body is smaller than the reference value, set a time period required for turning off the light source according to a vehicle speed of the vehicle so as to be shorter as the vehicle speed of the vehicle is higher; and a lighting control unit configured to bring the light source in a turned-off state over the time period set by the setting unit.

According to still another aspect of the presently disclosed subject matter, a vehicular light includes the lighting control device according to any of the foregoing aspects, and a light source configured to be controlled by the lighting control device According to still another aspect of the presently disclosed subject matter, a lighting control method is a method of controlling a lighting state of a light source installed in a vehicle, including: setting, when an inclination angle of a vehicle body in a vehicle width direction of the vehicle is smaller than a reference value, a time period required for turning off the light source to be shorter as the vehicle speed of the vehicle is higher, and bringing the light source in a turned-off state over the set time period.

According to the aforementioned configurations, it is possible to reduce the lighting delay when the light source is turned on in accordance with the bank angle of the vehicle.

Furthermore, it is possible to reduce the turning-off delay when the light source is turned off in accordance with the bank angle of the vehicle.

BRIEF DESCRIPTION OF DRAWINGS

These and other characteristics, features, and advantages of the presently disclosed subject matter will become clear from the following description with reference to the accompanying drawings, wherein:

FIG. 4 is a diagram describing data for setting the lighting control time period stored in a memory;

FIG. 12 is a diagram describing data for setting the turning-off control time period stored in the memory;

DESCRIPTION OF EXEMPLARY EMBODIMENTS

A description will now be made below to vehicular lights of the presently disclosed subject matter with reference to the accompanying drawings in accordance with exemplary embodiments.

First Exemplary Embodiment

Figure 1:
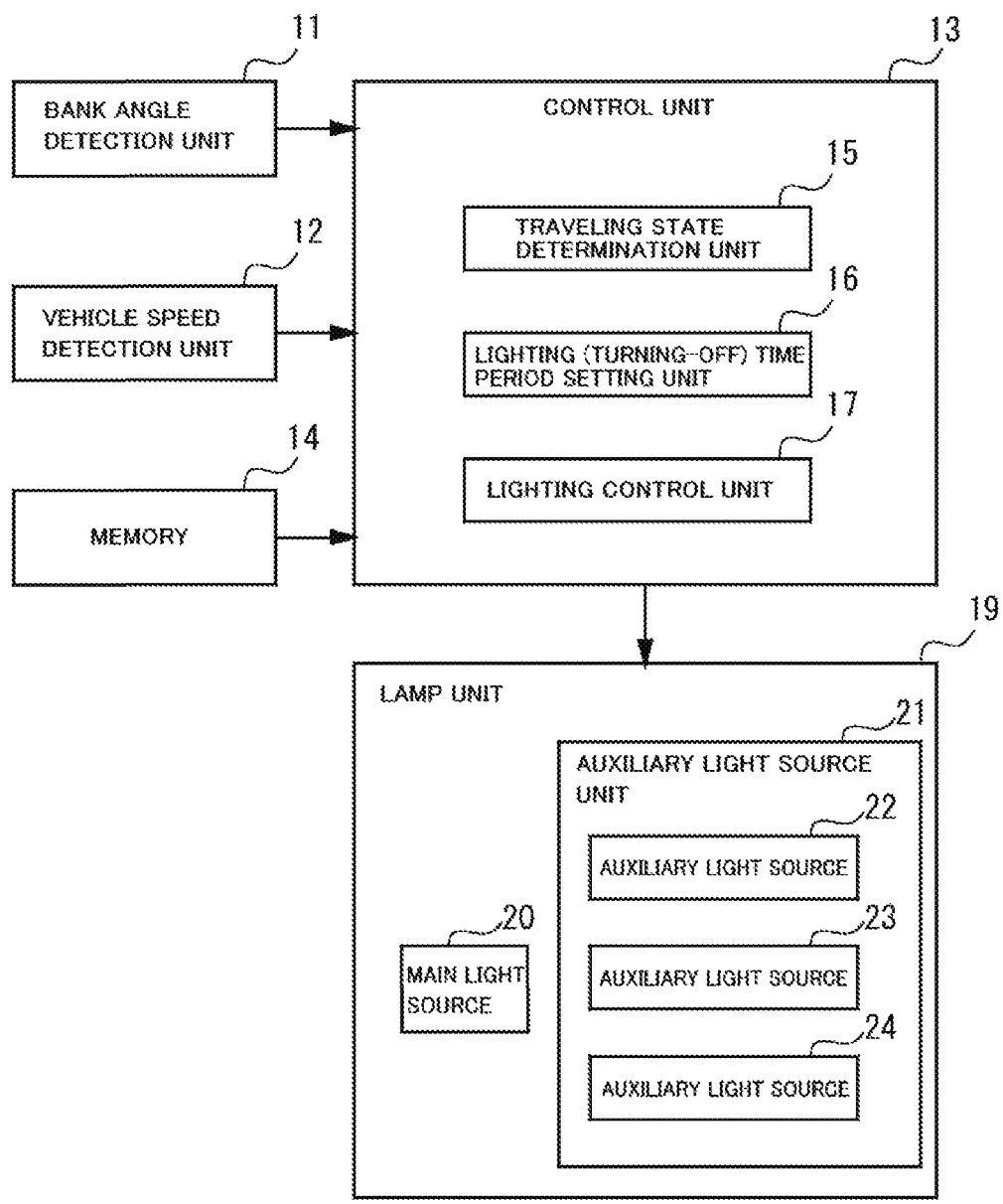
FIG. 1 is a block diagram illustrating a configuration of a vehicular light according to a first exemplary embodiment (and also a third exemplary embodiment)

FIG. 1 is a block diagram illustrating a configuration of a vehicular light according to a first exemplary embodiment. The illustrated vehicular light is, for example, a two-wheeled vehicle (motorcycle) or the like, which is installed in a vehicle which can run while tilting its body in the vehicle width direction at the time of turning, and which is used for irradiating light to an area in front of the vehicle. The vehicular light is configured to include a bank angle detection unit 11, a vehicle speed detection unit 12, a control unit 13, a memory 14, and a lamp unit 19.

The bank angle detection unit 11 detects a bank angle which is an inclination angle of the vehicle body in the vehicle width direction. The bank angle detection unit 11 is configured by using, for example, a gyro sensor. If a gyro sensor or the like is provided for another purpose in the vehicle, the bank angle detection unit 11 may be omitted while an output from the gyri sensor or the like can be used.

The vehicle speed detection unit 12 detects the speed of the vehicle when the vehicle is traveling. When a vehicle speed sensor or the like is provided for another purpose in the vehicle, the vehicle speed detection unit 12 may be omitted while the vehicle speed detected by the vehicle speed sensor or the like can be used.

The control unit 13 controls the overall operation of the vehicular light, and is realized by, for example, causing a microcomputer to execute a predetermined operation program.

The memory 14 is connected to the control unit 13, and stores data used for information processing in the control unit 13.

The lamp unit 19 is provided at a predetermined position in the front portion of the vehicle, and is configured to irradiate light to an area in front of the vehicle. In this exemplary embodiment, the lamp unit 19 includes a main light source 20 and an auxiliary light source unit 21. The main light source 20 is configured to emit light to an area in front of the vehicle during traveling. When the vehicle body of the vehicle is inclined and the light irradiation range by the main light source 20 is changed, the auxiliary light source unit 21 performs auxiliary light irradiation to the range in which the light by the headlight is hardly irradiated. For this reason, the auxiliary light source unit 21 is provided, for example, on both the left and right sides of the front portion of the vehicle, corresponding to the case where the vehicle body is inclined to the left and right, respectively. For convenience of description, only one of the auxiliary light source units 21 is shown in FIG. 1. The auxiliary light source unit 21 of the lamp unit 19 has a plurality of auxiliary light sources 22, 23, and 24, three in this example.

Figure 2:
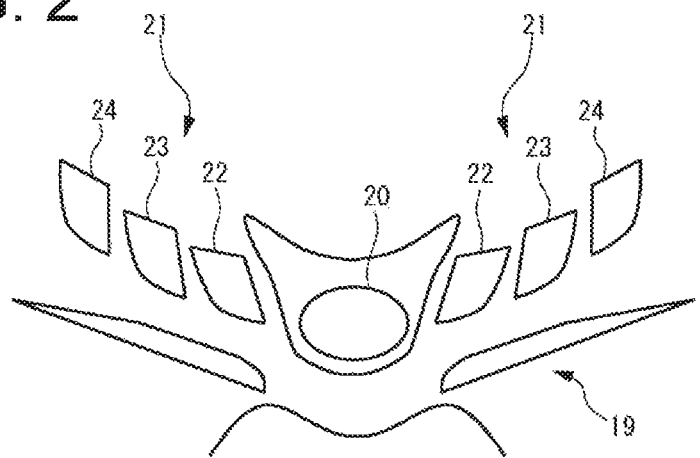
FIG. 2 is a diagram schematically illustrating a state in which a lamp unit is viewed from its front.

FIG. 2 is a diagram schematically illustrating a state in which the lamp unit 19 is viewed from its front. As illustrated in the figure, the main light source 20 is configured to perform main light irradiation toward an area in front of the vehicle at the time of travelling, and is disposed in the center of the lamp unit 19. Each of the auxiliary light sources 22, 23, and 24 of the auxiliary light source unit 21 is disposed on each of the right and left sides of the lamp unit 19. Each of the auxiliary light sources 22, 23, and 24 can be turned on and off independently, as well as it can be turned on and off at different timings according to the bank angle of the vehicle body. The lighting states of the main light source 20 and the auxiliary light sources 22, 23, and 24 are controlled by the control unit 13. The main light source 20 and each of the auxiliary light sources 22, 23, and 24 are configured by using a light-emitting element, for example, an LED. As the light source, a halogen lamp, a discharge lamp, or the like may also be used.

Figure 3A:
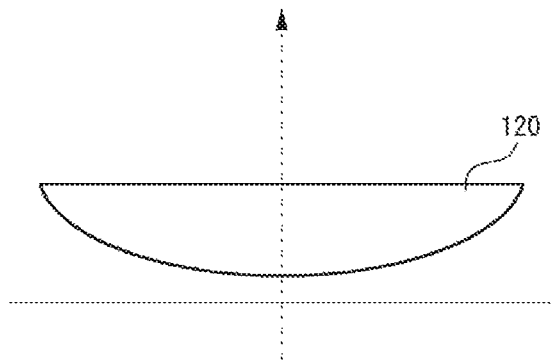
FIGS. 3A and 3B are each a diagram schematically illustrating a state of light distribution formed by the lamp unit.
Figure 3B:
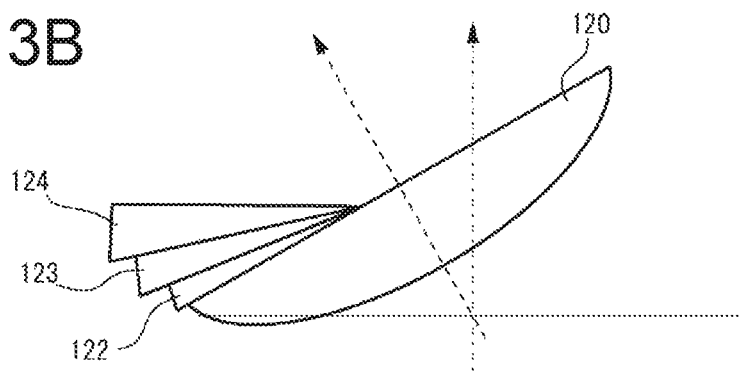

FIGS. 3A and 3B are each a diagram schematically illustrating a state of light distribution formed by the lamp unit. FIG. 3A illustrates the light distribution in a state where the vehicle body is not inclined (traveling on a straight road). As illustrated in the figure, the main light source 20 forms a main light distribution 120 having a substantially symmetric shape extending in the left and right directions in an area in front of the vehicle. FIG. 3B illustrates the light distribution in a state in which the vehicle body is inclined (travelling along a curved road). As illustrated in FIG. 3B, the main light distribution 120 formed by the main light source 20 is inclined relative to the horizontal direction, and in the illustrated example, the light emitted by the main light source 20 does not reach and thus is reduced in the left region. Therefore, the auxiliary light sources 22, 23, and 24 form the auxiliary light distributions 122, 123, and 124 in the region, respectively, thereby complementing visibility.

Reference is again made to FIG. 1. The control unit 13 includes a traveling state determination unit (determination unit) 15, a lighting (turning-off) time period setting unit (may be simply referred to as a setting unit) 16, and a lighting control unit 17 as functional blocks configured by executing a predetermined operation program in a microcomputer.

On the basis of the bank angle of the vehicle body detected by the bank angle detection unit 11, the traveling state determination unit 15 determines whether the vehicle is in a traveling state at the time of entering a curve (curved road). Specifically, for example, a reference value $\theta_v$ larger than 0° is set in advance. Then, the traveling state determination unit 15 determines whether the magnitude of the bank angle detected by the bank angle detection unit 11 is equal to or larger than the reference value $\theta_v$. When the magnitude is equal to or larger than the reference value $\theta_v$, the traveling state can be determined to be the traveling state at the time of entering a curve. The reference value $\theta_V$ may be appropriately set, and for example, the absolute value thereof may be set to 5°. In this case, for example, assuming that the inclination angle in the left direction is a positive value and the inclination angle in the right direction is a negative value, if the inclination angle becomes +5° or more, or −5° or less, the traveling state determination unit 15 can determine that the vehicle has entered the curve. The traveling state determination unit 15 may determine whether the absolute value of the bank angle is larger than the reference value $\theta_v$.

The lighting (turning-off) time period setting unit 16 sets the lighting control time period when each of the auxiliary light sources 22, 23, and 24 of the lamp unit 19 is turned on using the data stored in the memory 14 in accordance with the vehicle speed detected by the vehicle speed detection unit 12. The "lighting control time period" used herein means a time period required for the lighting rate of each of the auxiliary light sources 22, 23, and 24 to change from 0% (a relatively low set value) to 100% (a relatively high set value), that is, a time period required for substantially complete lighting. The relatively low set value is, for example, a value set in advance as the lowest light intensity (luminous intensity) when the vehicular light of the present exemplary embodiment is operated, and is typically 0%, but may be set to other values. Similarly, the relatively high set value is, for example, a value set in advance as the highest light intensity (luminous intensity) when the vehicular light of the present exemplary embodiment is operated, and is typically 100%, but may be set to other values.

When the traveling state determination unit 15 has determined that the vehicle has entered a curve (that is, when the bank angle is determined to be equal to or larger than the reference value $\theta_v$), the lighting control unit 17 turns on each of the auxiliary light sources 22, 23, and 24 during the lighting control time period set by the lighting (turning-off) time period setting unit 16. In the present exemplary embodiment, the lighting control unit 17 turns on the respective auxiliary light sources 22, 23, and 24 at different timings in accordance with the magnitude of the bank angle detected by the bank angle detection unit 11. The lighting control unit 17 also performs lighting control of the main light source 20.

FIG. 4 is a diagram describing data for setting the lighting control time period stored in the memory. As illustrated in the figure, the memory 14 stores a data table showing the vehicle speeds of the vehicle and the lighting control time periods corresponding to the respective vehicle speeds. For example, when the vehicle speed is 50 km/h, the lighting (turning-off) time period setting unit 16 reads out $T_{50}$ (ms) that is the corresponding lighting control time period from the memory 14, and sets the actual lighting control time period on the basis of the read out $T_{50}$ (ms). In the present exemplary embodiment, the relationship between the two is set such that the lighting control time period decreases (is shortened) as the vehicle speed increases. The specific value of the lighting control time period may be set to a suitable value obtained by an experiment or the like. Here, the vehicle speed is set in increments of 5 km/h for easy understanding of the description, but the presently disclosed subject matter is not limited to this aspect, and the increment of the vehicle speed can be arbitrarily set and the lighting control time period corresponding thereto can be stored.

Figure 5:
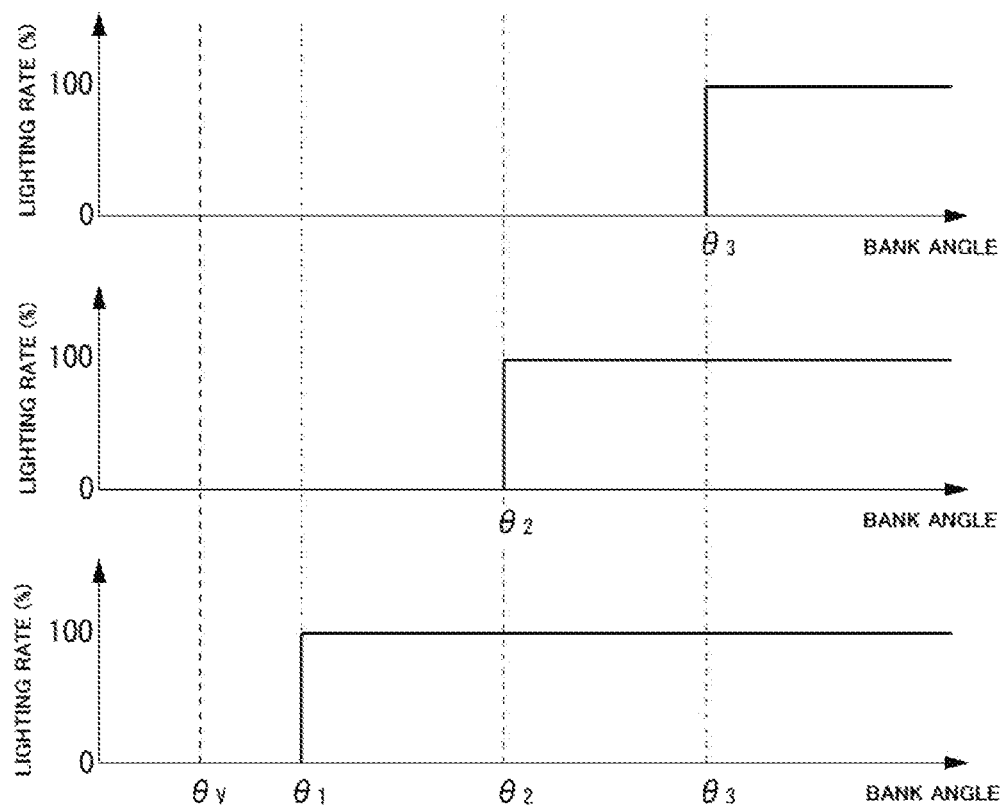
FIG. 5 is a diagram describing an operation of turning on respective auxiliary light sources at different timings according to the magnitude of the bank angle.

FIG. 5 is a diagram describing an operation of turning on respective auxiliary light sources at different timings according to the magnitude of the bank angle. In FIG. 5, a graph in which the horizontal axis corresponds to the bank angle and the vertical axis corresponds to the lighting rate is shown. As shown in the lower part of the drawing, three different threshold values are set for the bank angle, and the lighting control unit 17 turns on the auxiliary light source 22 when the bank angle becomes equal to or larger than the threshold value $\theta_1$ which is the smallest. The lighting control unit 17 turns on the auxiliary light source 23 when the bank angle becomes equal to or larger than the threshold value $\theta_2$ which is larger than the threshold value $\theta_1$. Further, the lighting control unit 17 turns on the auxiliary light source 24 when the bank angle becomes equal to or larger than the threshold $\theta_3$ which is larger than the threshold values $\theta_1$ and $\theta_2$. Note that instead of turning on the auxiliary light sources 22, 23, and 24 when the bank angle is equal to or larger than the respective threshold values $\theta_1$, $\theta_2$, and $\theta_3$, the respective auxiliary light sources 22, 23, and 24 may be turned on when the bank angle becomes larger than the respective threshold values $\theta_1$, $\theta_2$, and $\theta_3$.

In the present exemplary embodiment, the reference value $\theta_V$ having a value smaller than the respective threshold values $\theta_1$, $\theta_2$, and $\theta_3$ is set as described above, and the lighting (turning-off) time period setting unit 16 sets the lighting control time period on the basis of the vehicle speed at the time when the bank angle reaches the reference value $\theta_V$. Note that the lighting (turning-off) time period setting unit 16 may set the lighting control time period on the basis of the vehicle speed at any timing when the bank angle is equal to or larger than the reference value $\theta_V$ and smaller than the threshold value $\theta_1$.

Figure 6:
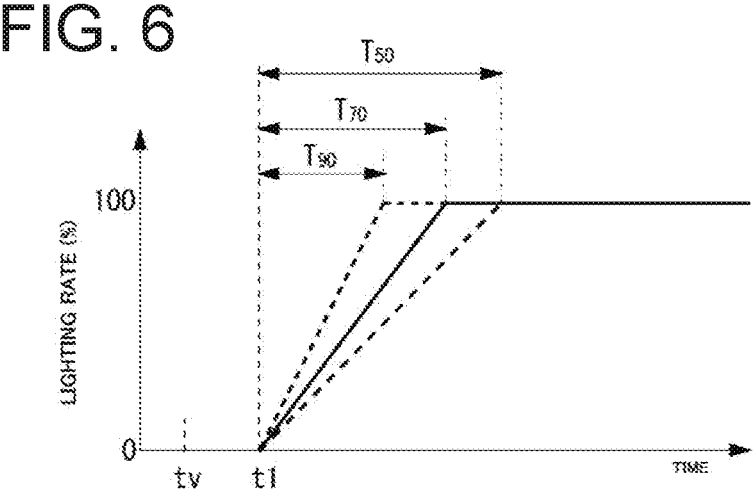
FIG. 6 is a diagram describing a relationship between the vehicle speed and the lighting control time period.

FIG. 6 is a diagram describing a relationship between the vehicle speed and the lighting control time period. In FIG. 6, a graph in which the horizontal axis corresponds to time and the vertical axis corresponds to the lighting rate is shown. As shown in the figure, the lighting control time period set by the lighting (turning-off) time period setting unit 16 is a time period required until the lighting rate, which was 0% at a certain time $t_1$, reaches 100%. In the illustrated examples, $T_{50}$, $T_{70}$, and $T_{90}$ are lighting control time periods corresponding to vehicle speeds of 50 km/h, 70 km/h, and 90 km/h, respectively, and the lighting control time period decreases (is shortened) as the vehicle speed increases. For example, if the bank angle becomes equal to or larger than the reference value $\theta_V$ at the time $t_V$ prior to the time $t_1$ and the vehicle speed detected at that time is 50 km/h, the lighting control time period $T_{50}$ corresponding to that vehicle speed is set. After that, when the bank angle becomes equal to or larger than the threshold value $\theta_1$ at the time $t_1$, the auxiliary light source 22 is controlled to be turned on so that the lighting rate becomes from 0/o to 100% from the time $t_1$ over the time period corresponding to the lighting control time period $T_{50}$. The lighting control of the other auxiliary light sources 23 and 24 is performed in the same manner. In the illustrated example, the lighting rate is linearly increased from 0% to 100%, but the manner of increase is not limited thereto and may be increased with increased rate (i.e., not linearly but curvedly).

Figure 7:
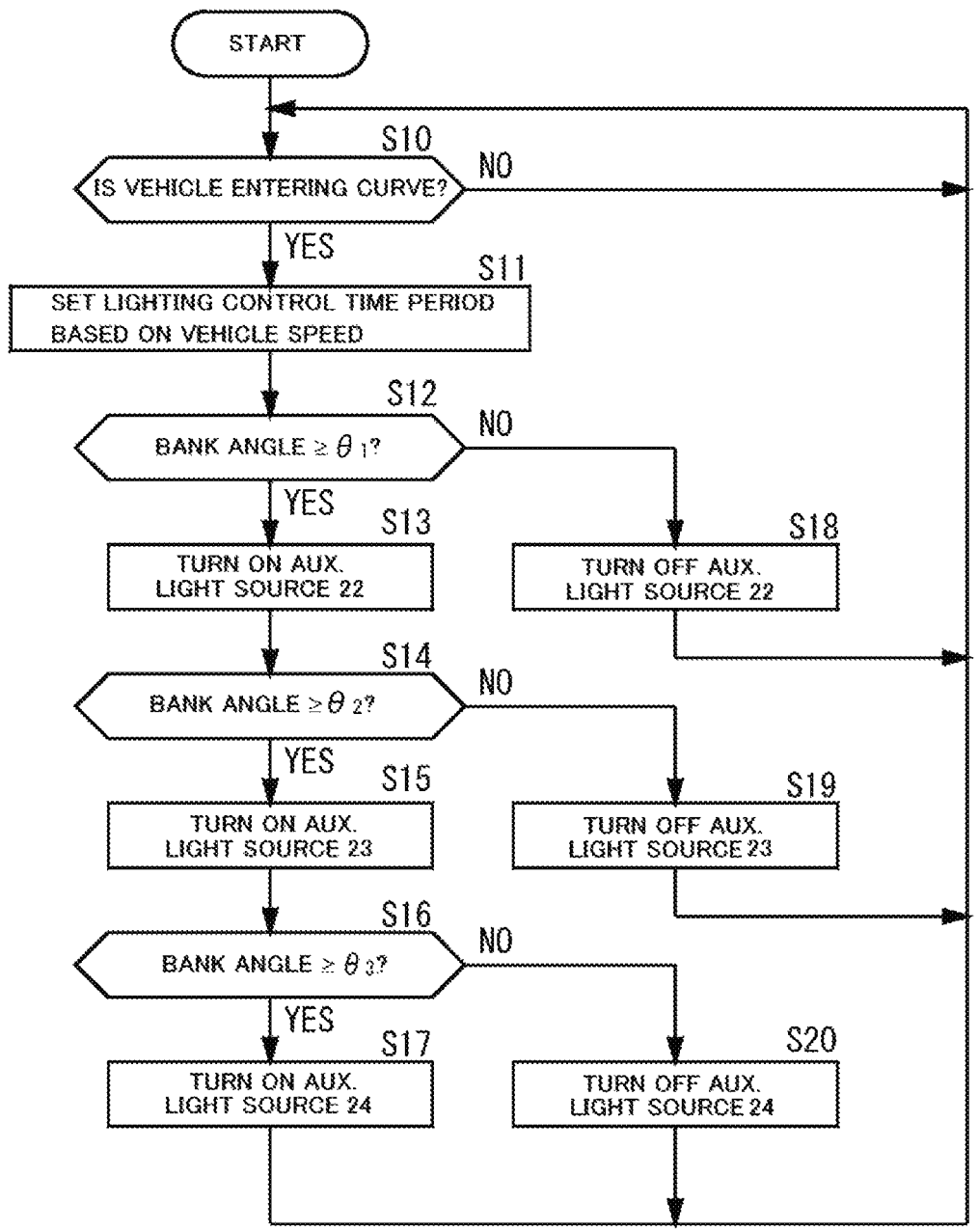
FIG. 7 is a flowchart showing a processing procedure performed by a control unit.

FIG. 7 is a flowchart showing a processing procedure performed by the control unit. Hereinafter, the processing procedure will be described in detail with reference to the flowchart. It should be noted that each of the illustrated processes can be executed in a mutually reversed order as long as there is no inconsistency or unconformity in the results, and such an aspect is not excluded.

The traveling state determination unit 15 determines whether the vehicle is in a traveling state at the time of entering a curve on the basis of the bank angle of the vehicle body (step S10). More specifically, the traveling state determination unit 15 determines that the vehicle enters the curve when the absolute value of the bank angle of the vehicle body is equal to or larger than the reference value $\theta_v$. When the traveling state determination unit 15 determines that the vehicle is not in the traveling state at the time of entering a curve (step S10; NO), the determination in step S10 is repeated.

When the traveling state determination unit 15 determines that the vehicle is in the traveling state at the time of entering the curve (step S10; YES), the lighting (turning-off) time period setting unit 16 sets the lighting control time period on the basis of the vehicle speed detected by the vehicle speed detection unit 12 (step S11).

Next, the lighting control unit 17 determines whether the bank angle of the vehicle body is equal to or larger than the threshold value $\theta_1$ (step S12). When the bank angle is equal to or larger than the threshold value $\theta_0$ (step S12; YES), the lighting control unit 17 performs control to turn on the auxiliary light source 22 (step S13).

Next, the lighting control unit 17 determines whether the bank angle of the vehicle body is equal to or larger than the threshold value $\theta_2$ (step S14). When the bank angle is equal to or larger than the threshold value $\theta_2$ (step S14; YES), the lighting control unit 17 performs control to turn on the auxiliary light source 23 (step S15).

Next, the lighting control unit 17 determines whether the bank angle of the vehicle body is equal to or larger than the threshold value $\theta_3$ (step S16). When the bank angle is equal to or larger than the threshold value $\theta_3$ (step S16; YES), the lighting control unit 17 performs control to turn on the auxiliary light source 24 (step S17). After that, the process returns to step S10 described above.

On the other hand, when the bank angle of the vehicle body is smaller than the threshold value $\theta_8$ (step S12; NO), the lighting control unit 17 performs control to turn off the auxiliary light source 22 (step S18). When the auxiliary light source 22 has already been turned off, the turned-off state is maintained. Similarly, when the bank angle of the vehicle body is smaller than the threshold value $\theta_2$ (step S14; NO), the lighting control unit 17 performs control to turn off the auxiliary light source 23 (step S19). When the auxiliary light source 23 has already been turned off, the turned-off state is maintained. Similarly, when the bank angle of the vehicle body is smaller than the threshold value $\theta_3$ (step S16; NO), the lighting control unit 17 performs control to turn off the auxiliary light source 23 (step S20). When the auxiliary light source 23 has already been turned off, the turned-off state is maintained. After the processing of each step has been performed, the process returns to step S10 described above.

According to the exemplary embodiment described above, it is possible to reduce the lighting delay when the light source is turned on in accordance with the bank angle of the vehicle. In general, the higher the vehicle speed, the more rapidly the bank angle tends to change. In the present exemplary embodiment, when the bank angle is larger than the reference value, that is, when the vehicle is estimated to be in the traveling state at the time of entering a curve, the lighting control is performed so that the light source is turned on more rapidly as the vehicle speed is higher, so that the lighting delay can be reduced.

Second Exemplary Embodiment

Figure 8:
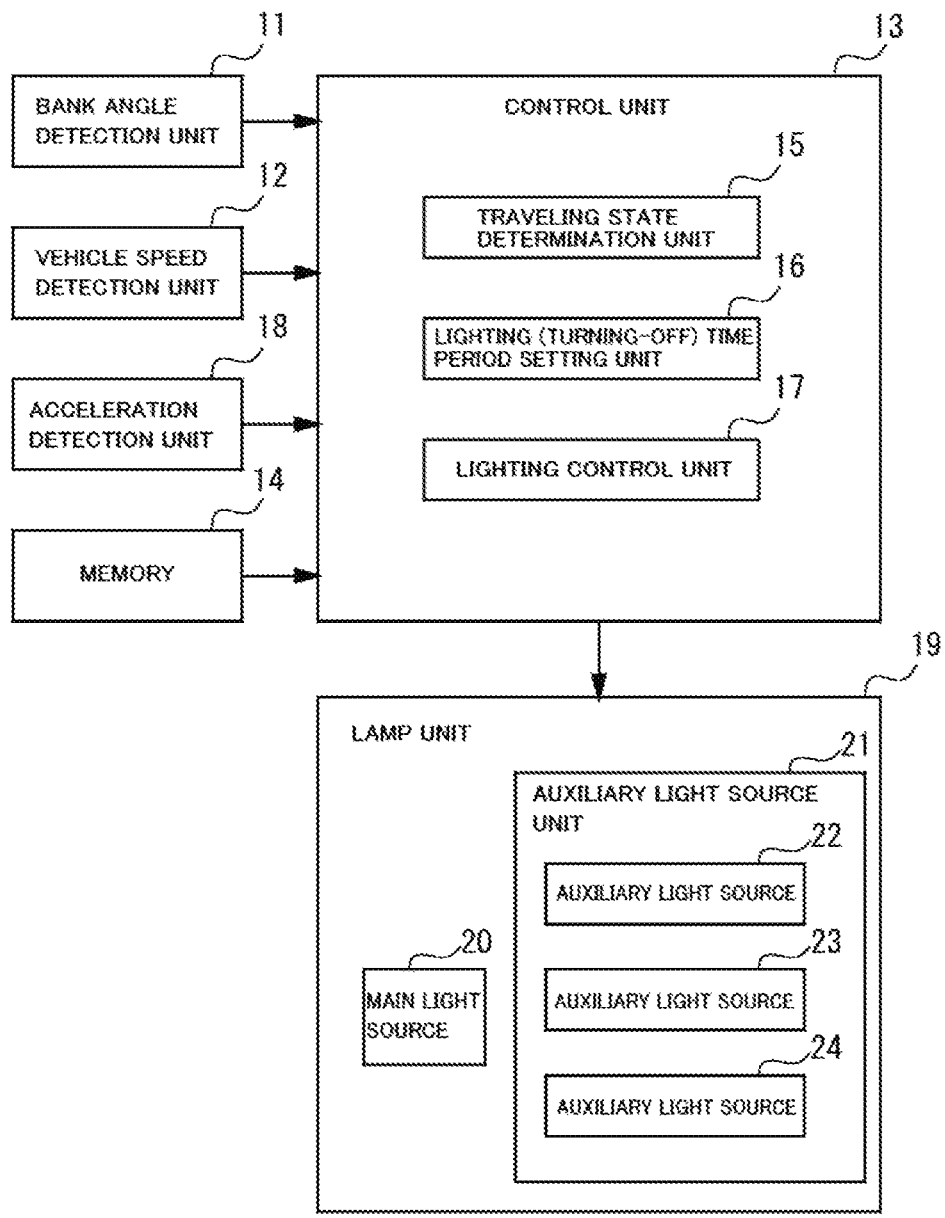
FIG. 8 is a block diagram illustrating a configuration of a vehicular light according to a second exemplary embodiment (and also a fourth exemplary embodiment)

FIG. 8 is a block diagram illustrating a configuration of a vehicular light according to a second exemplary embodiment. The configuration of the vehicular light according to the second exemplary embodiment is substantially the same as that of the vehicular light of the first exemplary embodiment except that an acceleration detection unit 18 is further provided, and accordingly, the lighting control time period is set by using the output of the acceleration detection unit 18 in the lighting (turning-off) time period setting unit 16 as well. Hereinafter, descriptions of the configuration common to both of them will be omitted, and different configurations will be described in detail.

The acceleration detection unit 18 detects, for example, acceleration in each of three XYZ axes orthogonal to each other. In the acceleration detection unit 18 of the present exemplary embodiment, it is assumed that the X-axis corresponds to the front-rear direction of the vehicle, the Y-axis corresponds to the left-right direction of the vehicle (vehicle width direction), and the Z-axis corresponds to the vertical direction of the vehicle (vehicle height direction). When the vehicle is provided with an acceleration detection sensor for another purpose, the acceleration detection unit 18 may be omitted while an output from the acceleration detection sensor for another purpose can be used.

On the basis of the vehicle speed detected by the vehicle speed detection unit 12 and the acceleration detected by the acceleration detection unit 18, the lighting (turning-off) time period setting unit 16 sets the lighting control time period when each of the auxiliary light sources 22, 23, and 24 of the lamp unit 19 is turned on using the data stored in the memory 14. The lighting (turning-off) time period setting unit 16 of the present exemplary embodiment sets the lighting control time period by using the acceleration (X-axis acceleration) in the front-rear direction of the vehicle detected by the acceleration detection unit 18.

Figures 9, 10:
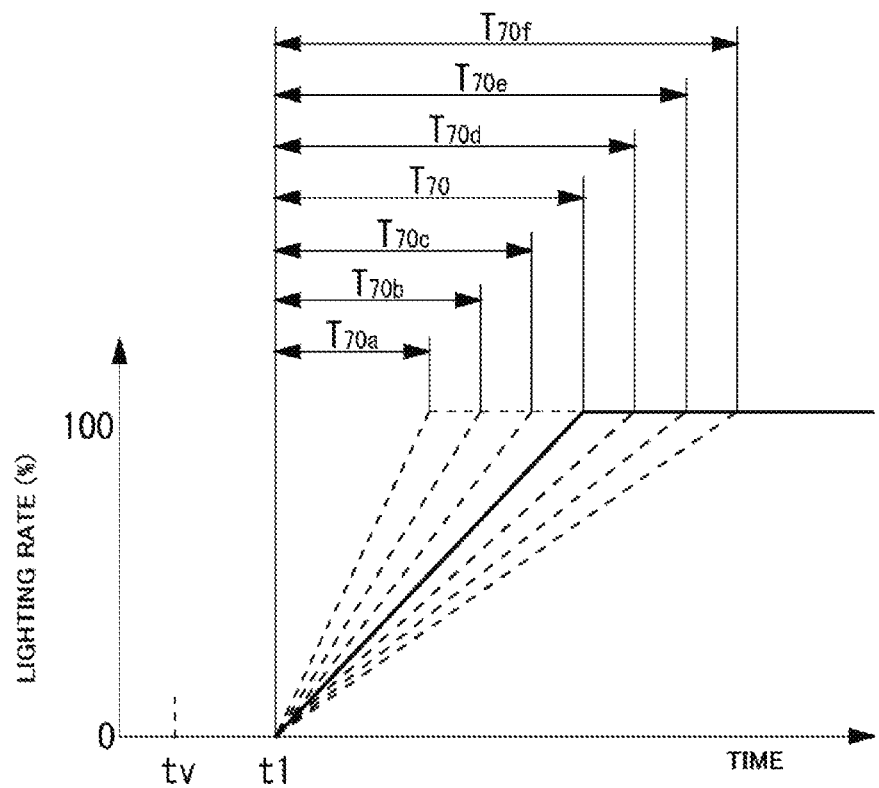
FIG. 9 is a diagram describing a relationship between the vehicle speed and the acceleration, and the lighting control time period.
FIG. 10 is a diagram describing data for setting the lighting control time period stored in the memory.

FIG. 9 is a diagram describing a relationship between the vehicle speed and the acceleration, and the lighting control time period. In FIG. 9, a graph in which the horizontal axis corresponds to the time and the vertical axis corresponds to the lighting rate is shown. For convenience of illustration, the scale of the horizontal axis is different from that of FIG. 6. As shown in FIG. 9, the lighting control time period set by the lighting (turning-off) time period setting unit 16 is a time period required for the lighting rate to change from 0% at a certain time $t_1$ to 100%. Also in the second exemplary embodiment, the lighting control time period is set so that the lighting control time period becomes smaller (shorter) as the vehicle speed increases, which is the same as that in the first exemplary embodiment (also see FIG. 6). Further, in the second exemplary embodiment, in accordance with the acceleration in the front-rear direction of the vehicle, when the acceleration is a negative value (when the vehicle is in an accelerated state), the lighting control time period is set to be shortened as the absolute value of the acceleration is larger (as the value is smaller). When the acceleration is a positive value (when the vehicle is in a decelerated state), the lighting control time period is set to be lengthened as the absolute value of the acceleration is larger. In other words, it can be said that the value is increased or decreased (corrected) by a predetermined amount in accordance with the acceleration with reference to the lighting control time period determined in accordance with the vehicle speed as a reference. In the present exemplary embodiment, it is assumed that the acceleration in the front-rear direction of the vehicle is detected as a negative value when the vehicle is accelerating in the traveling direction, and is detected as a positive value when the vehicle is decelerating in the traveling direction.

FIG. 9 illustrates the lighting control time period when the vehicle speed is 70 km/h. For example, the lighting control time period set when the acceleration is 0 is $T_{70}$. Further, the lighting control time period that is shorter than the $T_{70}$ is set when the acceleration is a negative value, and the lighting control time period that is longer than the $T_{70}$ is set when the acceleration is a positive value. In the present exemplary embodiment, when the acceleration is a negative value, the lighting control time period is set by selecting one of the three values of $T_{70a}$, $T_{70b}$, and $T_{70c}$ ($T_{70a} < T_{70b} < T_{70c}$) depending on the magnitude of the value of acceleration (i.e., the degree of acceleration). Similarly, when the acceleration is a positive value, the lighting control time period is set by selecting one of the three values of $T_{70d}$, $T_{70e}$, and $T_{70f}$ ($T_{70d} < T_{70e} < T_{70f}$) depending on the magnitude of the value of acceleration (i.e., the degree of acceleration).

FIG. 10 is a diagram for explaining data for setting the lighting control time period stored in the memory. As shown in the figure, the memory 14 stores a data table showing the vehicle speeds and acceleration of the vehicle, and the lighting control time periods corresponding to the respective vehicle speeds and accelerations. For example, when the vehicle speed is 50 km/h and the acceleration is 0, the lighting (turning-off) time period setting unit 16 reads out $T_{50}$ (ms) that is the corresponding lighting control time period from the memory 14, and sets the actual lighting control time period on the basis of the read out $T_{50}$ (ms). When the vehicle speed is 50 km/h and the acceleration is a negative value, the lighting (turning-off) time period setting unit 16 selects one of $T_{50a}$, $T_{50b}$, and $T_{50c}$ according to the magnitude of the acceleration, reads the selected value from the memory 14, and sets the lighting control time period on the basis of the selected value. In this case, for example, a range of −0.7 m/s$^2$ or more and smaller than 0 is set to "large," a range of −1.4 m/s$^2$ or more and smaller than −0.7 m/s$^2$ is set to "medium," and a range of −1.4 m/s$^2$ or less is set to "small." Then, the lighting (turning-off) time period setting unit 16 selects the lighting control time period in the range corresponding to the acceleration detected by the acceleration detection unit 18. The same applies to the case where the acceleration is a positive value, and the lighting (turning-off) time period setting unit 16 selects one of $T_{50d}$, $T_{50e}$, and $T_{50f}$ in accordance with the magnitude of the acceleration, reads the selected value from the memory 14, and sets the lighting control time period on the basis of the selected value.

The specific value of the lighting control time period may be set to a suitable value obtained by an experiment or the like. Although the vehicle speed is set in increments of 5 km/h for easy understanding of the description, the presently disclosed subject matter is not limited to this, and the increment of the vehicle speed can be arbitrarily set and the lighting control time period corresponding thereto can be stored. Similarly, the step width of the acceleration is not limited to the three steps shown as an example, but can be arbitrarily set and the lighting control time period corresponding thereto can be stored.

Figure 11:
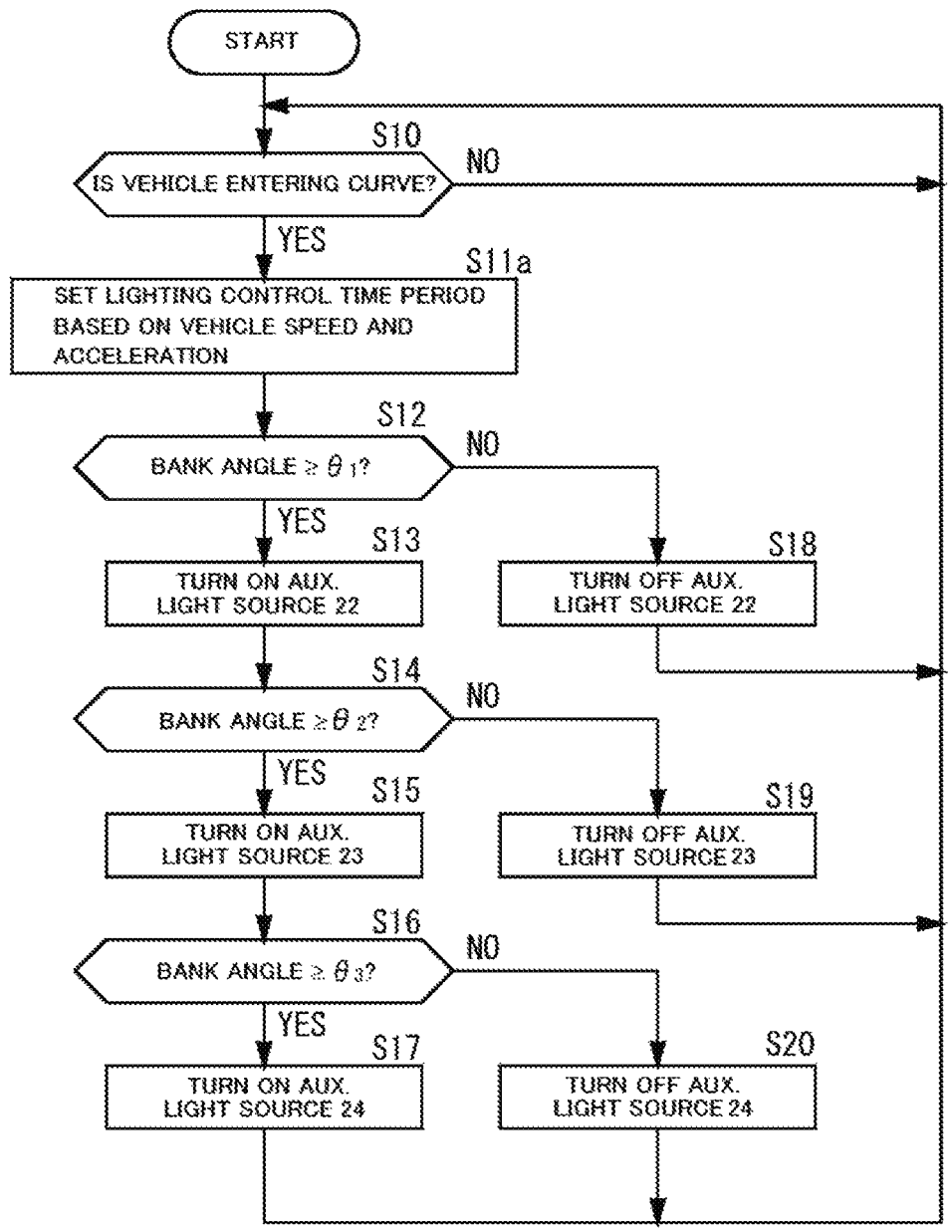
FIG. 11 is a flowchart showing a processing procedure performed by the control unit.

FIG. 11 is a flowchart showing a processing procedure performed by the control unit. Hereinafter, the processing procedure will be described in detail with reference to the flowchart. It should be noted that each of the illustrated processes can be executed in a mutually reversed order as long as there is no inconsistency or unconformity in the results, and such an aspect is not excluded. It should be noted that the processing procedures are substantially the same as those of the first exemplary embodiment described above (see FIG. 7), and only the processing in step S11a for setting the lighting control time period is different from S11. Thus, the explanation of the common matters will be omitted as appropriate, and main differences will be described.

When it is determined in step S10 that the vehicle is in a traveling state at the time of entering a curve (step S10; YES), the lighting (turning-off) time period setting unit 16 sets the lighting control time period on the basis of the vehicle speed detected by the vehicle speed detection unit 12 and the acceleration detected by the acceleration detection unit 18 (step S11a).

After that, the lighting control unit 17 performs control to appropriately turn on the auxiliary light sources 22, 23, and 24 in accordance with the bank angle of the vehicle body (steps S12 to S17). At this time, the lighting control time period that has been set in step S11a is used. On the other hand, the lighting control unit 17 performs control to turn off the auxiliary light sources 22, 23, and 24 as appropriate in accordance with the bank angle of the vehicle body (steps S18 to S20). After the processing of each step is performed, the process returns to step S10 described above.

According to the exemplary embodiment described above, it is possible to reduce the lighting delay when the light source is turned on in accordance with the bank angle of the vehicle. In general, the higher the vehicle speed, the more rapidly the bank angle tends to change. In the present exemplary embodiment, when the bank angle is larger than the reference value, that is, when the vehicle is estimated to be in the traveling state at the time of entering a curve, the lighting control is performed so that the light source is turned on more rapidly as the vehicle speed is higher, so that the lighting delay can be reduced. Further, in the present exemplary embodiment, since the lighting control time period is increased or decreased also in consideration of the acceleration at the time of entering a curve, it is possible to correct the lighting timing so as to be more appropriate.

Third Exemplary Embodiment

FIG. 1 is the block diagram illustrating the configuration of the vehicular light also according to a third exemplary embodiment. Hereinafter, descriptions of the configuration common to the first exemplary embodiment will be omitted, and different configurations will be described in detail.

Reference is again made to FIG. 1. As described above, the control unit 13 includes the traveling state determination unit (determination unit) 15, the lighting (turning-off) time period setting unit (setting unit) 16, and the lighting control unit 17 as functional blocks configured by executing a predetermined operation program in a microcomputer.

On the basis of the bank angle of the vehicle body detected by the bank angle detection unit 11, the traveling state determination unit 15 determines whether the vehicle is in a traveling state at the time of entering a straight road from a curve (curved road). Specifically, for example, a reference value $θ_v$ larger than 0° is set in advance. Then, the traveling state determination unit 15 determines whether the magnitude of the bank angle detected by the bank angle detection unit 11 is equal to or smaller than the reference value $θ_v$. When the magnitude is equal to or smaller than the reference value $θ_v$, the traveling state can be determined to be the traveling state at the time of entering a straight road from a curve. The reference value $θ_v$ may be appropriately set, and for example, the absolute value thereof may be set to 5°. In this case, for example, assuming that the inclination angle in the left direction is a positive value and the inclination angle in the right direction is a negative value, if the inclination angle becomes +5° or less, or −5° or more, the traveling state determination unit 15 can determine that the vehicle has entered the straight road from a curve. The traveling state determination unit 15 may determine whether the absolute value of the bank angle is smaller than the reference value $θ_v$.

The lighting (turning-off) time period setting unit 16 in this exemplary embodiment sets the turning-off control time period when each of the auxiliary light sources 22, 23, and 24 of the lamp unit 19 is turned off using the data stored in the memory 14 in accordance with the vehicle speed detected by the vehicle speed detection unit 12. The "turning-off control time period" used herein means a time period required for the lighting rate of each of the auxiliary light sources 22, 23, and 24 to change from 100% (a relatively high set value) to 0% (a relatively low set value), that is, a time period required for substantially complete turning-off. The relatively low set value is, for example, a value set in advance as the lowest light intensity (luminous intensity) when the vehicular light of the present exemplary embodiment is operated, and is typically 0%, but may be set to other values. Similarly, the relatively high set value is, for example, a value set in advance as the highest light intensity (luminous intensity) when the vehicular light of the present exemplary embodiment is operated, and is typically 100%, but may be set to other values.

In this exemplary embodiment, when the traveling state determination unit 15 has determined that the vehicle has entered a straight road from a curve (that is, when the absolute value of the bank angle is determined to be equal to or smaller than the reference value $θ_v$), the lighting control unit 17 turns off each of the auxiliary light sources 22, 23, and 24 during the turning-off control time period set by the lighting (turning-off) time period setting unit 16. In the present exemplary embodiment, the lighting control unit 17 turns off the respective auxiliary light sources 22, 23, and 24 at different timings in accordance with the magnitude of the bank angle detected by the bank angle detection unit 11. The lighting control unit 17 also performs lighting/turning-off control of the respective auxiliary light sources 22 and the like. The lighting control unit 17 turns on/off the respective auxiliary light sources 22, 23, and 24 at different timings in accordance with, for example, the magnitude of the bank angle.

FIG. 12 is a diagram describing data for setting the turning-off control time period stored in the memory. As illustrated in the figure, the memory 14 stores a data table showing the vehicle speeds of the vehicle and the turning-off control time periods corresponding to the respective vehicle speeds. For example, when the vehicle speed is 50 km/h, the lighting (turning-off) time period setting unit 16 reads out $T_{50}$ (ms) that is the corresponding turning-off control time period from the memory 14, and sets the actual turning-off control time period on the basis of the read out $T_{50}$ (ms). In the present exemplary embodiment, the relationship between the two is set such that the turning-off control time period decreases (is shortened) as the vehicle speed increases. The specific value of the turning-off control time period may be set to a suitable value obtained by an experiment or the like. Here, the vehicle speed is set in increments of 5 km/h for easy understanding of the description, but the presently disclosed subject matter is not limited to this aspect, and the increment of the vehicle speed can be arbitrarily set and the turning-off control time period corresponding thereto can be stored.

Figure 13:
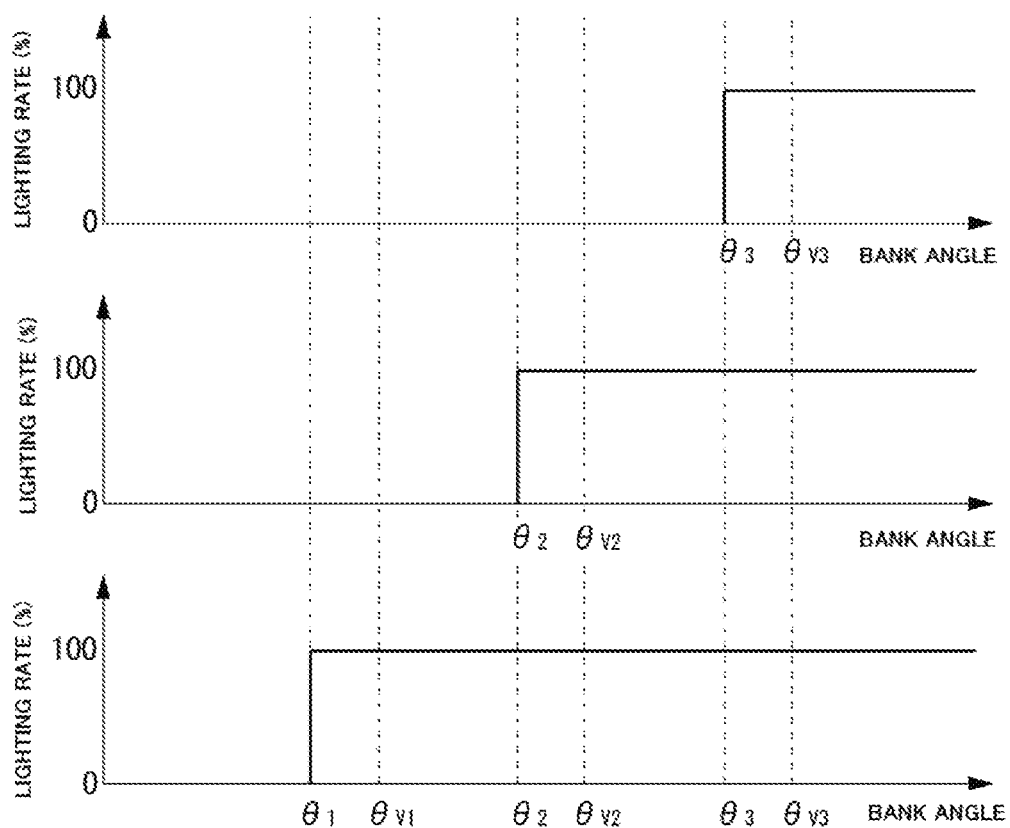
FIG. 13 is a diagram describing an operation of turning off respective auxiliary light sources at different timings according to the magnitude of the bank angle.

FIG. 13 is a diagram describing an operation of turning off respective auxiliary light sources at different timings according to the magnitude of the bank angle. In FIG. 13, a graph in which the horizontal axis corresponds to the bank angle and the vertical axis corresponds to the lighting rate is shown. As shown in the lower part of the drawing, three different threshold values are set for the bank angle, and the lighting control unit 17 turns off the auxiliary light source 24 when the bank angle becomes equal to or smaller than the threshold value $\theta_3$ which is the largest. The lighting control unit 17 turns off the auxiliary light source 23 when the bank angle becomes equal to or smaller than the threshold value $\theta_2$ which is larger than the threshold value $\theta_1$. Further, the lighting control unit 17 turns off the auxiliary light source 22 when the bank angle becomes equal to or smaller than the threshold value $\theta_1$ which is the smallest. Note that instead of turning off the auxiliary light sources 22, 23, and 24 when the bank angle is equal to or smaller than the respective threshold values $\theta_1$, $\theta_2$, and $\theta_3$, the respective auxiliary light sources 22, 23, and 24 may be turned off when the bank angle becomes smaller than the respective threshold values $\delta_1$, $\theta_2$, and $\theta_3$.

In the present exemplary embodiment, a reference value $\theta_{r3}$ having a value larger than the threshold value $\theta_3$ is set, and the lighting (turning-off) time period setting unit 16 sets the turning-off control time period for the auxiliary light source 24 on the basis of the vehicle speed at the time when the bank angle reaches the reference value $\theta_{r3}$. Similarly, a reference value $\theta_{r2}$ having a value larger than the threshold value $\theta_2$ is set, and the lighting (turning-off) time period setting unit 16 sets the turning-off control time period for the auxiliary light source 23 on the basis of the vehicle speed at the time when the bank angle reaches the reference value $\theta_{r2}$. Similarly, a reference value $\theta_{r1}$ having a value larger than the threshold value $\theta_1$ is set, and the lighting (turning-off) time period setting unit 16 sets the turning-off control time period for the auxiliary light source 22 on the basis of the vehicle speed at the time when the bank angle reaches the reference value $\theta_{r1}$. The lighting (turning-off) time period setting unit 16 may set the turning-off control time period on the basis of the vehicle speed at any timing when the bank angle is equal to or larger than the threshold value $\theta_1$ and smaller than the reference value $\theta_{r1}$. The turning-off control time period for the auxiliary light sources 23 and 24 can be set in the same manner as above. Furthermore, the lighting (turning-off) time period setting unit 16 may set the turning-off control time period for the respective auxiliary light sources 22, 23, and 24 on the basis of the vehicle speed at a timing when the bank angle reaches the reference value $\theta_{r3}$, and may set the turning-off control time period for the respective auxiliary light sources 22, 23, and 24 on the basis of the vehicle speed at any timing when the bank angle is equal to or larger than the threshold value $\theta_3$ and smaller than the reference value $\theta_{r3}$.

Figure 14:
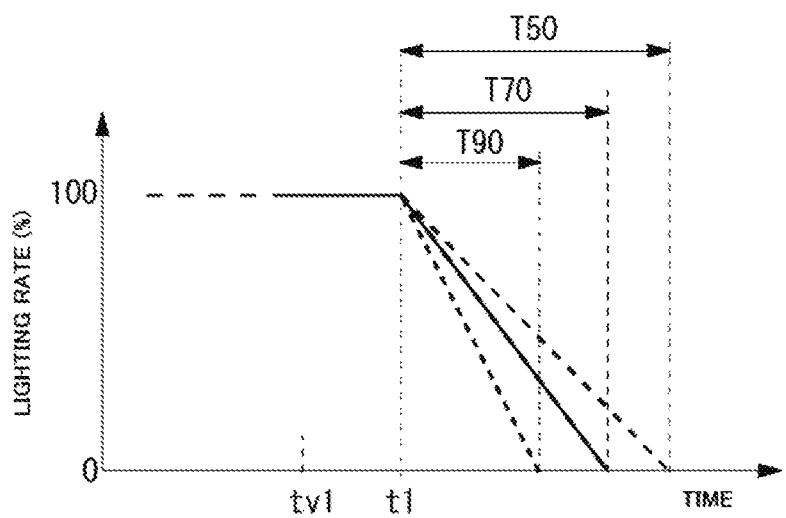
FIG. 14 is a diagram describing a relationship between the vehicle speed and the turning-off control time period.

FIG. 14 is a diagram describing a relationship between the vehicle speed and the turning-off control time period. In FIG. 14, a graph in which the horizontal axis corresponds to time and the vertical axis corresponds to the lighting rate is shown. As shown in the figure, the turning-off control time period set by the lighting (turning-off) time period setting unit 16 is a time period required until the lighting rate, which was 100% at a certain time $t_1$, reaches 0%. In the illustrated examples, $T_{50}$, $T_{70}$, and $T_{90}$ are turning-off control time periods corresponding to vehicle speeds of 50 km/h, 70 km/h, and 90 km/h, respectively, and the turning-off control time period decreases (is shortened) as the vehicle speed increases. For example, if the bank angle becomes equal to or smaller than (or simply smaller than) the reference value $\theta_{r1}$ at the time $t_{r1}$ prior to the time $t_1$ and the vehicle speed detected at that time is 50 km/h, the turning-off control time period $T_{50}$ corresponding to the vehicle speed is set. After that, when the bank angle becomes equal to or smaller than the threshold value $\theta_1$ at the time $t_1$, the auxiliary light source 22 is controlled to be turned off so that the lighting rate becomes from 100% to 0% from the time $t_1$ over the time period corresponding to the turning-off control time period $T_{50}$. The turning-off control of the other auxiliary light sources 23 and 24 is performed in the same manner. In the illustrated example, the lighting rate is linearly decreased from 100% to 0%, but the manner of decrease is not limited thereto and may be decreased with increased rate (i.e., not linearly but curvedly).

Figure 15:
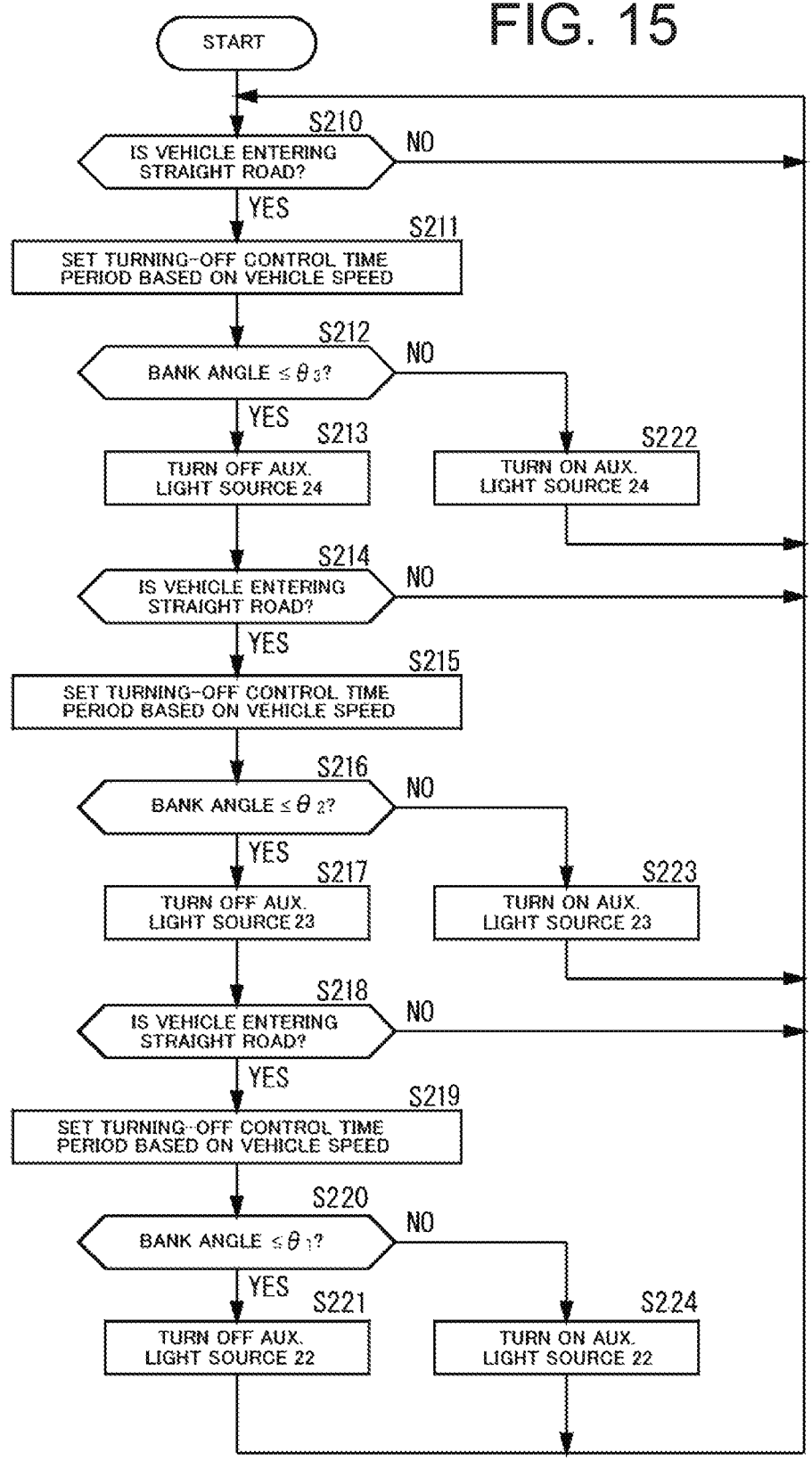
FIG. 15 is a flowchart showing a processing procedure performed by a control unit.

FIG. 15 is a flowchart showing a processing procedure performed by the control unit. Hereinafter, the processing procedure will be described in detail with reference to the flowchart. It should be noted that each of the illustrated processes can be executed in a mutually reversed order as long as there is no inconsistency or unconformity in the results, and such an aspect is not excluded.

The traveling state determination unit 15 determines whether the vehicle is in a traveling state at the time of entering a straight road on the basis of the bank angle of the vehicle body (step S210). More specifically, the traveling state determination unit 15 determines that the vehicle enters the straight road when the absolute value of the bank angle of the vehicle body is equal to or smaller than the reference value $\theta_{r3}$. When the traveling state determination unit 15 determines that the vehicle is not in the traveling state at the time of entering a straight road (step S210; NO), the determination in step S210 is repeated.

When the traveling state determination unit 15 determines that the vehicle is in the traveling state at the time of entering the straight road (step Ss10; YES), the lighting (turning-off) time period setting unit 16 sets the turning-off control time period on the basis of the vehicle speed detected by the vehicle speed detection unit 12 (step S211).

Next, the lighting control unit 17 determines whether the bank angle of the vehicle body is equal to or smaller than the threshold value $\theta_3$ (step S212). When the bank angle is equal to or smaller than the threshold value $\theta_3$ (step S212; YES), the lighting control unit 17 performs control to turn off the auxiliary light source 24 (step S213).

The traveling state determination unit 15 determines whether the vehicle is in a traveling state at the time of entering the straight road on the basis of the bank angle of the vehicle body (step S214). More specifically, the traveling state determination unit 15 determines that the vehicle is entering the straight road when the absolute value of the bank angle of the vehicle body is equal to or smaller than the reference value $\theta_{v2}$. In other words, the traveling state determination unit 15 determines that the entering state into the straight road is maintained. When the traveling state determination unit 15 determines that the vehicle is not in the traveling state at the time of entering the straight road (step S214; NO), the process returns to step S210 to repeat the process thereafter.

When the traveling state determination unit 15 determines that the vehicle is in the traveling state at the time of entering the straight road (step S214; YES), the lighting (turning-off) time period setting unit 16 sets the turning-off control time period on the basis of the vehicle speed detected by the vehicle speed detection unit 12 (step S215).

Next, the lighting control unit 17 determines whether the bank angle of the vehicle body is equal to or smaller than the threshold value $\theta_2$ (step S216). When the bank angle is equal to or smaller than the threshold value $\theta_2$ (step S216; YES), the lighting control unit 17 performs control to turn off the auxiliary light source 23 (step S217).

Next, the traveling state determination unit 15 determines whether the vehicle is in a traveling state at the time of entering the straight road on the basis of the bank angle of the vehicle body (step S218). More specifically, the traveling state determination unit 15 determines that the vehicle is entering the straight road when the absolute value of the bank angle of the vehicle body is equal to or smaller than the reference value $\theta_{v1}$. In other words, the traveling state determination unit 15 determines that the entering state into the straight road is maintained. When the traveling state determination unit 15 determines that the vehicle is not in the traveling state at the time of entering the straight road (step S218; NO), the process returns to step S210 to repeat the process thereafter.

When the traveling state determination unit 15 determines that the vehicle is in the traveling state at the time of entering the straight road (step S218; YES), the lighting (turning-off) time period setting unit 16 sets the turning-off control time period on the basis of the vehicle speed detected by the vehicle speed detection unit 12 (step S219).

Next, the lighting control unit 17 determines whether the bank angle of the vehicle body is equal to or smaller than the threshold value $\theta_1$ (step S220). When the bank angle is equal to or smaller than the threshold value $\theta_1$ (step S220; YES), the lighting control unit 17 performs control to turn off the auxiliary light source 22 (step S221). Then, the process returns to step S210 described above.

On the other hand, when the bank angle of the vehicle body is larger than the threshold value $\theta_3$ (step S212; NO), the lighting control unit 17 performs control to turn on the auxiliary light source 24 (step S222). When the auxiliary light source 24 has already been turned on, the turned-on state is maintained. Similarly, when the bank angle of the vehicle body is larger than the threshold value $\theta_2$ (step S216; NO), the lighting control unit 17 performs control to turn on the auxiliary light source 23 (step S223). When the auxiliary light source 23 has already been turned on, the turned-on state is maintained. Similarly, when the bank angle of the vehicle body is larger than the threshold value $\theta_0$ (step S219; NO), the lighting control unit 17 performs control to turn on the auxiliary light source 22 (step S224). When the auxiliary light source 22 has already been turned on, the turning-on state is maintained. After the processing of each step has been performed, the process returns to step S210 described above.

According to the exemplary embodiment described above, it is possible to reduce the turning-off delay when the light source is turned off in accordance with the bank angle of the vehicle. In general, the higher the vehicle speed, the more rapidly the bank angle tends to change. In the present exemplary embodiment, when the bank angle is smaller than the reference value, that is, when the vehicle is estimated to be in the traveling state at the time of entering a straight road, the lighting control is performed so that the light source is turned off more rapidly as the vehicle speed is higher, so that the turning-off delay can be reduced.

Fourth Exemplary Embodiment

FIG. 8 is a block diagram illustrating the configuration of a vehicular light also according to a fourth exemplary embodiment. The configuration of the vehicular light according to the fourth exemplary embodiment is substantially the same as that of the vehicular light of the third exemplary embodiment except that an acceleration detection unit 18 is further provided, and accordingly, the turning-off control time period is set by using the output of the acceleration detection unit 18 in the lighting (turning-off) time period setting unit 16 as well. Hereinafter, descriptions of the configuration common to both of them will be omitted, and different configurations will be described in detail.

On the basis of the vehicle speed detected by the vehicle speed detection unit 12 and the acceleration detected by the acceleration detection unit 18, the lighting (turning-off) time period setting unit 16 sets the turning-off control time period when each of the auxiliary light sources 22, 23, and 24 of the lamp unit 19 is turned off using the data stored in the memory 14. The lighting (turning-off) time period setting unit 16 of the present exemplary embodiment sets the turning-off control time period by using the acceleration (X-axis acceleration) in the front-rear direction of the vehicle detected by the acceleration detection unit 18.

Figures 16, 17:
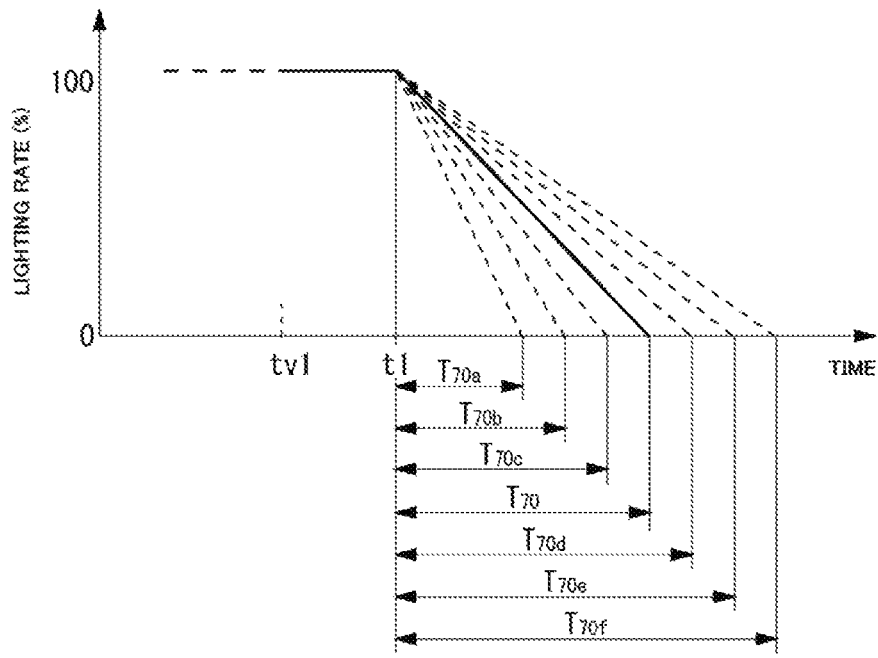
FIG. 16 is a diagram describing a relationship between the vehicle speed and the acceleration, and the turning-off control time period.
FIG. 17 is a diagram describing data for setting the turning-off control time period stored in the memory.

FIG. 16 is a diagram describing a relationship between the vehicle speed and the acceleration, and the turning-off control time period. In FIG. 16, a graph in which the horizontal axis corresponds to the time and the vertical axis corresponds to the lighting rate is shown. For convenience of illustration, the scale of the horizontal axis is different from that of FIG. 14. As shown in FIG. 16, the turning-off control time period set by the lighting (turning-off) time period setting unit 16 is a time period required for the lighting rate to change from 100% at a certain time $t_1$ to 0%. Also in the fourth exemplary embodiment, the turning-off control time period is set so that the turning-off control time period becomes smaller (shorter) as the vehicle speed increases, which is the same as that in the third exemplary embodiment (also see FIG. 14). Further, in the fourth exemplary embodiment, in accordance with the acceleration in the front-rear direction of the vehicle, when the acceleration is a negative value (when the vehicle is in an accelerated state), the turning-off control time period is set to be shortened as the absolute value of the acceleration is larger (as the value is smaller). When the acceleration is a positive value (when the vehicle is in a decelerated state), the turning-off control time period is set to be lengthened as the absolute value of the acceleration is larger. In other words, it can be said that the value is increased or decreased (corrected) by a predetermined amount in accordance with the acceleration with reference to the turning-off control time period determined in accordance with the vehicle speed as a reference. In the present exemplary embodiment, it is assumed that the acceleration in the front-rear direction of the vehicle is detected as a negative value when the vehicle is accelerating in the traveling direction, and is detected as a positive value when the vehicle is decelerating in the traveling direction.

FIG. 16 illustrates the turning-off control time period when the vehicle speed is 70 km/h. For example, the turning-off control time period set when the acceleration is 0 is $T_{70}$. Further, the turning-off control time period that is shorter than the $T_{70}$ is set when the acceleration is a negative value, and the turning-off control time period that is longer than the $T_{70}$ is set when the acceleration is a positive value. In the present exemplary embodiment, when the acceleration is a negative value, the turning-off control time period is set by selecting one of the three values of $T_{70a}$, $T_{70b}$, and $T_{70c}$ ($T_{70a} < T_{70b} < T_{70c}$) depending on the magnitude of the value of acceleration (i.e., the degree of acceleration). Similarly, when the acceleration is a positive value, the turning-off control time period is set by selecting one of the three values of $T_{70d}$, $T_{70e}$, and $T_{70f}$ ($T_{70d}<T_{70e}<T_{70f}$) depending on the magnitude of the value of acceleration (i.e., the degree of acceleration).

FIG. 17 is a diagram for explaining data for setting the turning-off control time period stored in the memory. As shown in the figure, the memory 14 stores a data table showing the vehicle speeds and acceleration of the vehicle, and the turning-off control time periods corresponding to the respective vehicle speeds and accelerations. For example, when the vehicle speed is 50 km/h and the acceleration is 0, the lighting (turning-off) time period setting unit 16 reads out $T_{50}$ (ms) that is the corresponding turning-off control time period from the memory 14, and sets the actual turning-off control time period on the basis of the read out $T_{50}$ (ms). When the vehicle speed is 50 km/h and the acceleration is a negative value, the lighting (turning-off) time period setting unit 16 selects one of $T_{50a}$, $T_{50b}$, and $T_{50c}$ according to the magnitude of the acceleration, reads the selected value from the memory 14, and sets the turning-off control time period on the basis of the selected value. In this case, for example, a range of −0.7 m/s$^2$ or more and smaller than 0 is set to "large," a range of −1.4 m/s$^2$ or more and smaller than −0.7 m/s$^2$ is set to "medium," and a range of −1.4 m/s$^2$ or less is set to "small." Then, the lighting (turning-off) time period setting unit 16 selects the turning-off control time period in the range corresponding to the acceleration detected by the acceleration detection unit 18. The same applies to the case where the acceleration is a positive value, and the lighting (turning-off) time period setting unit 16 selects one of $T_{50d}$, $T_{50e}$, and $T_{50f}$ in accordance with the magnitude of the acceleration, reads the selected value from the memory 14, and sets the turning-off control time period on the basis of the selected value.

The specific value of the turning-off control time period may be set to a suitable value obtained by an experiment or the like. Although the vehicle speed is set in increments of 5 km/h for easy understanding of the description, the present invention is not limited to this, and the increment of the vehicle speed can be arbitrarily set and the turning-off control time period corresponding thereto can be stored. Similarly, the step width of the acceleration is not limited to the three steps shown as an example, but can be arbitrarily set and the turning-off control time period corresponding thereto can be stored.

Figure 18:
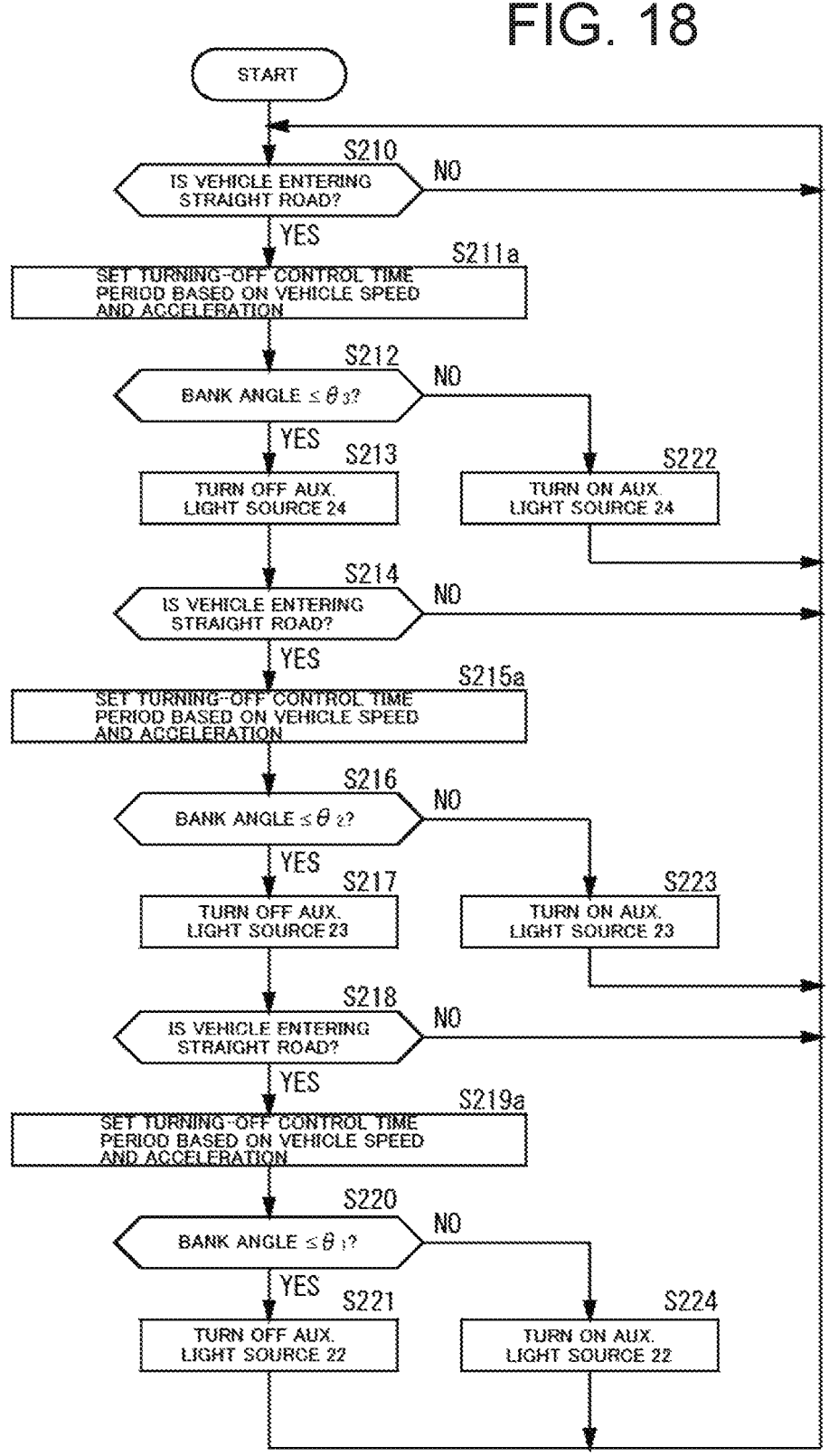
FIG. 18 is a flowchart showing a processing procedure performed by a control unit.

FIG. 18 is a flowchart showing a processing procedure performed by the control unit. Hereinafter, the processing procedure will be described in detail with reference to the flowchart. It should be noted that each of the illustrated processes can be executed in a mutually reversed order as long as there is no inconsistency or unconformity in the results, and such an aspect is not excluded. It should be noted that the processing procedures are substantially the same as those of the third exemplary embodiment described above (see FIG. 15), and only the processing in steps S211a, S215a, and S219a for setting the turning-off control time period is different from that in the corresponding steps. Thus, the explanation of the common matters will be omitted as appropriate, and main differences will be described.

When it is determined in step S210 that the vehicle is in a traveling state at the time of entering a straight road (step S210; YES), the lighting (turning-off) time period setting unit 16 sets the turning-off control time period on the basis of the vehicle speed detected by the vehicle speed detection unit 12 and the acceleration detected by the acceleration detection unit 18 (step S211a).

After that, the lighting control unit 17 performs control to appropriately turn off or turn on the auxiliary light source 24 in accordance with the bank angle of the vehicle body (steps S212, S213, and S222). At this time, the turning-off control time period that has been set in step S211a is used.

When it is determined in step S214 that the vehicle is in a traveling state at the time of entering a straight road (step S214; YES), the lighting (turning-off) time period setting unit 16 sets the turning-off control time period on the basis of the vehicle speed detected by the vehicle speed detection unit 12 and the acceleration detected by the acceleration detection unit 18 (step S215a).

After that, the lighting control unit 17 performs control to appropriately turn off or turn on the auxiliary light source 23 in accordance with the bank angle of the vehicle body (steps S216, S217, and S223). At this time, the turning-off control time period that has been set in step S215a is used.

When it is determined in step S218 that the vehicle is in a traveling state at the time of entering a straight road (step S218; YES), the lighting (turning-off) time period setting unit 16 sets the turning-off control time period on the basis of the vehicle speed detected by the vehicle speed detection unit 12 and the acceleration detected by the acceleration detection unit 18 (step S219a).

After that, the lighting control unit 17 performs control to appropriately turn off or turn on the auxiliary light source 22 in accordance with the bank angle of the vehicle body (steps S220, S221, and S224). At this time, the turning-off control time period that has been set in step S219a is used.

According to the exemplary embodiment described above, it is possible to reduce the turning-off delay when the light source is turned off in accordance with the bank angle of the vehicle. In general, the higher the vehicle speed, the more rapidly the bank angle tends to change. In the present exemplary embodiment, when the bank angle is smaller than the reference value, that is, when the vehicle is estimated to be in the traveling state at the time of entering a straight road, the lighting control is performed so that the light source is turned off more rapidly as the vehicle speed is higher, so that the turning-off delay can be reduced. Further, in the present exemplary embodiment, since the turning-off control time period is increased or decreased also in consideration of the acceleration at the time of entering a straight road, it is possible to correct the turning-off timing so as to be more appropriate.

It should be noted that the presently disclosed subject matter is not limited to the contents of the above-mentioned exemplary embodiments, and can be implemented by various modifications made thereon within the scope of the gist of the present invention. For example, in the exemplary embodiments described above, a motorcycle is given as an example of a vehicle to which the presently disclosed subject matter can be applied, but the vehicle is not limited to this, and may include a three-wheel (or four-wheel) motorcycle with an inclination function of its vehicle body.

Further, in each of the exemplary embodiments described above, the lighting control time period and turning-off control time period are set according to the vehicle speed and the acceleration by referring to the data table stored in the memory 14 in advance, but the method of setting the lighting control time period/turning-off control time period is not limited to this, and various setting methods are conceivable. For example, the relationship between the vehicle speed and the acceleration and the corresponding lighting control time period and turning-off control time period may be expressed by a calculation formula, and the lighting control time period and turning-off control time period may be set in accordance with the vehicle speed using the calculation formula.

In each of the exemplary embodiments described above, a lamp unit having three auxiliary light sources is used, and each auxiliary light source is turned on/off at different timings according to the bank angle, but at least one auxiliary light source is sufficient. Furthermore, the three auxiliary light sources may be turned on/off at the same timing. Furthermore, in the exemplary embodiments described above, the auxiliary light source has been described as an example of the light source, but the scope of application of the presently disclosed subject matter is not limited to this, and a light source for any purpose may be used as long as it is installed in a vehicle.

In the second and fourth exemplary embodiments, the acceleration in the front-rear direction of the vehicle is considered as the acceleration used for setting the lighting control time period and turning-off control time period, but the acceleration in each of the left-right direction of the vehicle and the vertical direction of the vehicle may be further used. For example, the lighting control time period and turning-off control time period may be set using an acceleration value obtained by combining the acceleration in the front-rear direction of the vehicle and the acceleration in the left-right direction of the vehicle. That is, any value may be used as long as it has a correlation with the acceleration in the front-rear direction of the vehicle. The acceleration used for setting the lighting control time period and turning-off control time period is not limited to the acceleration obtained by the acceleration detection unit 18, and may be obtained by, for example, performing differentiation processing on the vehicle speed detected by the vehicle speed detection unit 12. In this case, the vehicle speed sensor and the control unit 13 function as an acceleration detection unit.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A lighting control device for a light source installed in a vehicle, the lighting control device comprising:
processing circuitry configured to
determine whether an inclination angle of a vehicle body in a vehicle width direction of the vehicle is larger than a reference value, the reference value being larger than 0°;
in response to determining that the inclination angle of the vehicle body is larger than the reference value, set a time period required for changing a lighting rate of the light source from 0% brightness level to 100% brightness level according to a vehicle speed of the vehicle such that the time period becomes shorter as the vehicle speed of the vehicle is higher, the vehicle speed being a speed of the vehicle toward a moving direction of the vehicle;
determine whether the inclination angle of the vehicle body is larger than a threshold value, the threshold value being larger than the reference value; and
in response to determining that the inclination angle of the vehicle body is larger than the threshold value, start changing the lighting rate of the light source from 0% brightness level to 100% brightness level over the set time period.

2. The lighting control device according to claim 1, wherein the processing circuitry is configured to set the time period required for turning on the light source to a first value obtained by reducing a value set according to the vehicle speed of the vehicle by a predetermined value when the vehicle is accelerated, and to a second value obtained by increasing the value set according to the vehicle speed of the vehicle by the predetermined value when the vehicle is decelerated.

3. The lighting control device according to claim 2, wherein the processing circuitry is configured to determine a state where the vehicle is accelerated or decelerated on a basis of an acceleration having a relation with an acceleration in a front-rear direction of the vehicle.

4. The lighting control device according to claim 2, wherein the first value is set to a smaller value as a degree of the acceleration of the vehicle is larger, and the second value is set to a larger value as a degree of the deceleration of the vehicle is larger.

5. The light control device according to claim 1, wherein the processing circuitry is further configured to:
determine whether the inclination angle of the vehicle body in the vehicle width direction of the vehicle is smaller than a second reference value, the second reference value being larger than 0°;
in response to determining that the inclination angle of the vehicle body is smaller than the second reference value, set a second time period required for changing the lighting rate of the light source from 100% brightness level to 0% brightness level according to a vehicle speed of the vehicle such that the time period becomes shorter as the vehicle speed of the vehicle is higher, the vehicle speed being a speed of the vehicle toward a moving direction of the vehicle;
determine whether the inclination angle of the vehicle body is smaller than a second threshold value, the second threshold value being smaller than the second reference value; and
in response to determining that the inclination angle of the vehicle body is smaller than the second threshold value, start changing the lighting rate of the light source from 100% brightness level to 0% brightness level over the set second time period.

6. A lighting control method for a light source configured to control a lighting state of a light source installed in a vehicle, the lighting control method comprising:
determining, using processing circuitry, whether an inclination angle of a vehicle body in a vehicle width direction of the vehicle is larger than a reference value, the reference value being larger than 0°;
in response to determining that the inclination angle of the vehicle body is larger than the reference value, setting, using the processing circuitry, a time period required for changing a lighting rate of the light source from 0% brightness level to 100% brightness level according to a vehicle speed of the vehicle such that the time period becomes shorter as the vehicle speed of the vehicle is higher, the vehicle speed being a speed of the vehicle toward a moving direction of the vehicle;
determining, using the processing circuitry, whether the inclination angle of the vehicle body is larger than a threshold value, the threshold value being larger than the reference value; and
in response to determining that the inclination angle of the vehicle body is larger than the threshold value, starting, using the processing circuitry, changing the lighting rate of the light source from 0% brightness level to 100% brightness level over the set time period.

7. The lighting control method according to claim 6, wherein the time period required for turning on the light source is set to a first value obtained by reducing a value set according to the vehicle speed of the vehicle by a predetermined value when the vehicle is accelerated, and to a second value obtained by increasing the value set according to the vehicle speed of the vehicle by the predetermined value when the vehicle is decelerated.

8. The lighting control method according to claim 7, further comprising determining a state where the vehicle is accelerated or decelerated on a basis of an acceleration having a relation with an acceleration in a front-rear direction of the vehicle.

9. The lighting control method according to claim 7, wherein the first value is set to a smaller value as a degree of the acceleration of the vehicle is larger, and the second value is set to a larger value as a degree of the deceleration of the vehicle is larger.

10. The light control method according to claim 6, wherein the method further comprises:
   determining, using the processing circuitry, whether the inclination angle of the vehicle body in the vehicle width direction of the vehicle is smaller than a second reference value, the second reference value being larger than 0°;
   in response to determining that the inclination angle of the vehicle body is smaller than the second reference value, setting, using the processing circuitry, a second time period required for changing the lighting rate of the light source from 100% brightness level to 0% brightness level according to a vehicle speed of the vehicle such that the time period becomes shorter as the vehicle speed of the vehicle is higher, the vehicle speed being a speed of the vehicle toward a moving direction of the vehicle;
   determining, using the processing circuitry, whether the inclination angle of the vehicle body is smaller than a second threshold value, the second threshold value being smaller than the second reference value; and
   in response to determining that the inclination angle of the vehicle body is smaller than the second threshold value, starting, using the processing circuitry, changing the lighting rate of the light source from 100% brightness level to 0% brightness level over the set second time period.

11. A lighting control device for a light source installed in a vehicle, the lighting control device comprising:
   processing circuitry configured to
      determine whether an inclination angle of a vehicle body in a vehicle width direction of the vehicle is smaller than a reference value, the reference value being larger than 0°;
      in response to determining that the inclination angle of the vehicle body is smaller than the reference value, set a time period required for changing a lighting rate of the light source from 100% brightness level to 0 brightness level according to a vehicle speed of the vehicle such that the time period becomes shorter as the vehicle speed of the vehicle is higher, the vehicle speed being a speed of the vehicle toward a moving direction of the vehicle;
      determine whether the inclination angle of the vehicle body is smaller than a threshold value, the threshold value being smaller than the reference value; and
      in response to determining that the inclination angle of the vehicle body is smaller than the threshold value, start changing the lighting rate of the light source from 100% brightness level to 0% brightness level over the set time period.

12. The lighting control device according to claim 11, wherein the processing circuitry is configured to set the time period required for turning off the light source to a first value obtained by reducing a value set according to the vehicle speed of the vehicle by a predetermined value when the vehicle is accelerated, and to a second value obtained by increasing the value set according to the vehicle speed of the vehicle by the predetermined value when the vehicle is decelerated.

13. The lighting control device according to claim 12, wherein the processing circuitry is configured to determine a state where the vehicle is accelerated or decelerated on a basis of an acceleration having a relation with an acceleration in a front-rear direction of the vehicle.

14. The lighting control device according to claim 12, wherein the first value is set to a smaller value as a degree of the acceleration of the vehicle is larger, and the second value is set to a larger value as a degree of the deceleration of the vehicle is larger.

15. The light control device according to claim 11, wherein the processing circuitry is further configured to:
   determine whether the inclination angle of the vehicle body in the vehicle width direction of the vehicle is larger than a second reference value, the second reference value being larger than 0°;
   in response to determining that the inclination angle of the vehicle body is larger than the second reference value, set a second time period required for changing the lighting rate of the light source from 0% brightness level to 100% brightness level according to a vehicle speed of the vehicle such that the time period becomes shorter as the vehicle speed of the vehicle is higher, the vehicle speed being a speed of the vehicle toward a moving direction of the vehicle;
   determine whether the inclination angle of the vehicle body is larger than a second threshold value, the second threshold value being larger than the second reference value; and
   in response to determining that the inclination angle of the vehicle body is larger than the second threshold value, start changing the lighting rate of the light source from 0% brightness level to 100% brightness level over the set second time period.

16. A lighting control method for a light source configured to control a lighting state of a light source installed in a vehicle, the lighting control method comprising:
   determining, using processing circuitry, whether an inclination angle of a vehicle body in a vehicle width direction of the vehicle is smaller than a reference value, the reference value being larger than 0°;
   in response to determining that the inclination angle of the vehicle body is smaller than the reference value, setting, using the processing circuitry, a time period required for changing a lighting rate of the light source from 100% brightness level to 0% brightness level according to a vehicle speed of the vehicle such that the time period becomes shorter as the vehicle speed of the vehicle is higher, the vehicle speed being a speed of the vehicle toward a moving direction of the vehicle;

determining, using the processing circuitry, whether the inclination angle of the vehicle body is smaller than a threshold value, the threshold value being smaller than the reference value; and in response to determining that the inclination angle of the vehicle body is smaller than the threshold value, starting, using the processing circuitry, changing the lighting rate of the light source from 100% brightness level to 0% brightness level over the set time period.

17. The lighting control device according to claim 16, wherein the time period required for turning off the light source is set to a first value obtained by reducing a value set according to the vehicle speed of the vehicle by a predetermined value when the vehicle is accelerated, and to a second value obtained by increasing the value set according to the vehicle speed of the vehicle by the predetermined value when the vehicle is decelerated.

18. The lighting control device according to claim 17, further comprising determining a state where the vehicle is accelerated or decelerated on a basis of an acceleration having a relation with an acceleration in a front-rear direction of the vehicle.

19. The lighting control device according to claim 17, wherein the first value is set to a smaller value as a degree of the acceleration of the vehicle is larger, and the second value is set to a larger value as a degree of the deceleration of the vehicle is larger.

20. The light control method according to claim 16, wherein the method further comprises:

determining, using the processing circuitry, whether the inclination angle of the vehicle body in the vehicle width direction of the vehicle is larger than a second reference value, the second reference value being larger than 0°;

in response to determining that the inclination angle of the vehicle body is larger than the second reference value, setting, using the processing circuitry, a second time period required for changing the lighting rate of the light source from 0% brightness level to 100% brightness level according to a vehicle speed of the vehicle such that the time period becomes shorter as the vehicle speed of the vehicle is higher, the vehicle speed being a speed of the vehicle toward a moving direction of the vehicle;

determining, using the processing circuitry, whether the inclination angle of the vehicle body is larger than a second threshold value, the second threshold value being larger than the second reference value; and in response to determining that the inclination angle of the vehicle body is larger than the second threshold value, starting, using the processing circuitry, changing the lighting rate of the light source from 0% brightness level to 100% brightness level over the set second time period.

* * * * *